(12) United States Patent
Kedem et al.

(10) Patent No.: US 10,728,761 B2
(45) Date of Patent: Jul. 28, 2020

(54) METHOD, DEVICE, AND SYSTEM OF DETECTING A LIE OF A USER WHO INPUTS DATA

(71) Applicant: BioCatch Ltd., Tel Aviv (IL)

(72) Inventors: Oren Kedem, Tel Aviv (IL); Avi Turgeman, Cambridge, MA (US)

(73) Assignee: BIOCATCH LTD., Tel Aviv (IL)

( * ) Notice: Subject to any disclaimer, the term of this patent is extended or adjusted under 35 U.S.C. 154(b) by 0 days.

(21) Appl. No.: 15/847,946

(22) Filed: Dec. 20, 2017

(65) Prior Publication Data

US 2018/0115899 A1    Apr. 26, 2018

Related U.S. Application Data

(63) Continuation-in-part of application No. 14/675,764, filed on Apr. 1, 2015, now abandoned, which is a
(Continued)

(51) Int. Cl.
*H04W 12/06* (2009.01)
*G06F 21/31* (2013.01)
(Continued)

(52) U.S. Cl.
CPC ............ *H04W 12/06* (2013.01); *G06F 3/041* (2013.01); *G06F 21/31* (2013.01); *G06F 21/316* (2013.01);
(Continued)

(58) Field of Classification Search
CPC ........ H04W 12/06; G06F 3/017; G06F 3/041; G06F 3/0847; G06F 21/31; G06F 21/32;
(Continued)

(56) References Cited

U.S. PATENT DOCUMENTS 3,618,019 A    11/1971  Nemirovsky
3,699,517 A    10/1972  Dyche
(Continued)

FOREIGN PATENT DOCUMENTS

EP    2410450        1/2012
EP    2410450 A1    1/2012
(Continued)

OTHER PUBLICATIONS

Bailey, Kyle O., "Computer Based Behavioral Biometric Authentication Via Multi-Modal Fusion", Thesis, 2013, Air Force Institute of Technology.
(Continued)

*Primary Examiner* — Daniel B Potratz
*Assistant Examiner* — William B Jones
(74) *Attorney, Agent, or Firm* — Eitan Mehulal Sadot (57) ABSTRACT

Method, device, and system of detecting a lie of a user who inputs data. A method includes monitoring input-unit gestures and interactions of a user that inputs data through an electronic device; and based on analysis of the input-unit gestures and interactions, determining that the user has inputted false data through the electronic device. A particular fillable field, or a particular question, are identified as having untrue input from the user. Optionally, spatial orientation data of the electronic device is taken into account in the determination process. Optionally, contextual analysis is utilized, to determine that the input-unit gestures and interactions reflect an attempt of the user to perform a beautifying modification of a data-item to his benefit.

2 Claims, 1 Drawing Sheet

Related U.S. Application Data continuation-in-part of application No. 14/566,723, filed on Dec. 11, 2014, now Pat. No. 9,071,969, which is a continuation-in-part of application No. 13/992,271, filed on Jun. 20, 2013, now Pat. No. 8,938,787, which is a continuation-in-part of application No. 13/877,676, filed as application No. PCT/IL2011/000907 on Nov. 29, 2011, now Pat. No. 9,069,942, said application No. 14/675,764 is a continuation-in-part of application No. 14/320,653, filed on Jul. 1, 2014, now Pat. No. 9,275,337, and a continuation-in-part of application No. 14/320,656, filed on Jul. 1, 2014, now Pat. No. 9,665,703, and a continuation-in-part of application No. 14/325,393, filed on Jul. 8, 2014, now Pat. No. 9,531,733, and a continuation-in-part of application No. 14/325,394, filed on Jul. 8, 2014, now Pat. No. 9,547,766, and a continuation-in-part of application No. 14/325,395, filed on Jul. 8, 2014, now Pat. No. 9,621,567, and a continuation-in-part of application No. 14/325,396, filed on Jul. 8, 2014, now abandoned, and a continuation-in-part of application No. 14/325,397, filed on Jul. 8, 2014, now Pat. No. 9,450,971, and a continuation-in-part of application No. 14/325,398, filed on Jul. 8, 2014, now Pat. No. 9,477,826.

(60) Provisional application No. 61/973,855, filed on Apr. 2, 2014, provisional application No. 61/417,479, filed on Nov. 29, 2010, provisional application No. 61/843,915, filed on Jul. 9, 2013.

(51) Int. Cl.
  *G06F 21/32* (2013.01)
  *G06F 21/55* (2013.01)
  *H04M 1/725* (2006.01)
  *G06F 3/041* (2006.01)

(52) U.S. Cl.
  CPC ............ *G06F 21/32* (2013.01); *G06F 21/554* (2013.01); *H04M 1/72522* (2013.01)

(58) Field of Classification Search
  CPC ............ G06F 21/554; G06F 17/30032; H04M 1/72522
  See application file for complete search history.

(56) References Cited

U.S. PATENT DOCUMENTS

| | | | |
|---|---|---|---|
| 3,983,535 | A | 9/1976 | Herbst |
| 4,128,829 | A | 12/1978 | Herbst |
| 4,621,334 | A | 11/1986 | Garcia |
| 4,760,386 | A | 7/1988 | Heath |
| 4,805,222 | A | 2/1989 | Young |
| 5,305,238 | A | 4/1994 | Starr |
| 5,442,342 | A | 8/1995 | Kung |
| 5,485,171 | A | 1/1996 | Copper |
| 5,557,686 | A | 9/1996 | Brown |
| 5,565,657 | A | 10/1996 | Merz |
| 5,581,261 | A | 12/1996 | Hickman |
| 5,838,306 | A | 11/1998 | O'Connor |
| 5,874,941 | A | 2/1999 | Yamada |
| 5,999,162 | A | 12/1999 | Takahashi |
| 6,202,023 | B1 | 3/2001 | Hancock |
| 6,337,686 | B2 | 1/2002 | Wong |
| 6,337,919 | B1 | 1/2002 | Dunton |
| 6,442,692 | B1 | 8/2002 | Zilberman |
| 6,572,014 | B1 | 6/2003 | Lambert |
| 6,819,219 | B1 | 11/2004 | Bolle |
| 6,836,554 | B1 | 12/2004 | Bolle |
| 6,895,514 | B1 | 5/2005 | Kermani |
| 6,931,131 | B1 | 8/2005 | Becker |
| 6,938,061 | B1 | 8/2005 | Rumynin |
| 6,938,159 | B1 | 8/2005 | O'Connor |
| 6,957,185 | B1 | 10/2005 | Labaton |
| 6,957,186 | B1 | 10/2005 | Guheen |
| 6,983,061 | B2 | 1/2006 | Ikegami |
| 7,092,926 | B2 | 8/2006 | Cerrato |
| 7,130,452 | B2 | 10/2006 | Bolle |
| 7,133,792 | B2 | 11/2006 | Murakami |
| 7,139,916 | B2 | 11/2006 | Billingsley |
| 7,158,118 | B2 | 1/2007 | Liberty |
| 7,236,156 | B2 | 6/2007 | Liberty |
| 7,245,218 | B2 | 7/2007 | Ikehara |
| 7,366,919 | B1 | 4/2008 | Sobel |
| 7,395,436 | B1 | 7/2008 | Nemovicher |
| 7,494,061 | B2 | 2/2009 | Reinhold |
| 7,523,191 | B1 | 4/2009 | Thomas |
| 7,535,456 | B2 | 5/2009 | Liberty |
| 7,606,915 | B1 | 10/2009 | Calinov |
| 7,796,013 | B2 | 9/2010 | Murakami |
| 7,818,290 | B2 | 10/2010 | Davis |
| 7,860,870 | B2 | 12/2010 | Sadagopan |
| 8,031,175 | B2 | 10/2011 | Rigazio |
| 8,065,624 | B2 | 11/2011 | Morin |
| 8,125,312 | B2 | 2/2012 | Orr |
| 8,156,324 | B1 | 4/2012 | Shnowske |
| 8,201,222 | B2 | 6/2012 | Inoue |
| 8,285,658 | B1 | 10/2012 | Kellas-Dicks |
| 8,417,960 | B2 | 4/2013 | Takahashi |
| 8,433,785 | B2 | 4/2013 | Awadallah |
| 8,449,393 | B2 | 5/2013 | Sobel |
| 8,499,245 | B1 | 7/2013 | Froment |
| 8,510,113 | B1 | 8/2013 | Conkie |
| 8,548,208 | B2 | 10/2013 | Schultz |
| 8,549,629 | B1 | 10/2013 | Mccreesh |
| 8,555,077 | B2 | 10/2013 | Davis |
| 8,745,729 | B2 | 6/2014 | Poluri |
| 8,788,838 | B1 | 8/2014 | Fadell |
| 8,803,797 | B2 | 8/2014 | Scott |
| 8,819,812 | B1 | 8/2014 | Weber |
| 8,832,823 | B2 | 9/2014 | Boss |
| 8,838,060 | B2 | 9/2014 | Walley |
| 8,880,441 | B1 | 11/2014 | Chen |
| 8,898,787 | B2 | 11/2014 | Thompson |
| 8,938,787 | B2 | 1/2015 | Turgeman |
| 8,941,466 | B2 | 1/2015 | Bayram |
| 8,990,959 | B2 | 3/2015 | Zhu |
| 9,069,942 | B2 | 6/2015 | Turgeman |
| 9,071,969 | B2 | 6/2015 | Turgeman |
| 9,154,534 | B1 | 10/2015 | Gayles |
| 9,174,123 | B2 | 11/2015 | Nasiri |
| 9,195,351 | B1 | 11/2015 | Rosenberg |
| 9,275,337 | B2 | 3/2016 | Turgeman |
| 9,282,112 | B2 | 3/2016 | Filatov |
| 9,301,140 | B1 | 3/2016 | Costigan |
| 9,304,915 | B2 | 4/2016 | Adams |
| 9,418,221 | B2 | 8/2016 | Turgeman |
| 9,450,971 | B2 | 9/2016 | Turgeman |
| 9,477,826 | B2 | 10/2016 | Turgeman |
| 9,483,292 | B2 | 11/2016 | Turgeman |
| 9,526,006 | B2 | 12/2016 | Turgeman |
| 9,529,987 | B2 | 12/2016 | Deutschmann |
| 9,531,701 | B2 | 12/2016 | Turgeman |
| 9,531,733 | B2 | 12/2016 | Turgeman |
| 9,536,071 | B2 | 1/2017 | Turgeman |
| 9,541,995 | B2 | 1/2017 | Turgeman |
| 9,547,766 | B2 | 1/2017 | Turgeman |
| 9,552,470 | B2 | 1/2017 | Turgeman |
| 9,558,339 | B2 | 1/2017 | Turgeman |
| 9,589,120 | B2 | 3/2017 | Samuel |
| 9,621,567 | B2 | 4/2017 | Turgeman |
| 9,626,677 | B2 | 4/2017 | Turgeman |
| 9,654,485 | B1 | 5/2017 | Neumann |
| 9,665,703 | B2 | 5/2017 | Turgeman |
| 9,674,218 | B2 | 6/2017 | Turgeman |
| 9,690,915 | B2 | 6/2017 | Turgeman |
| 9,703,953 | B2 | 7/2017 | Turgeman |
| 9,710,316 | B1 | 7/2017 | Chheda |
| 9,712,558 | B2 | 7/2017 | Turgeman |

(56) References Cited

U.S. PATENT DOCUMENTS

| | | |
|---|---|---|
| 9,747,436 B2 | 8/2017 | Turgeman |
| 9,779,423 B2 | 10/2017 | Turgeman |
| 9,838,373 B2 | 12/2017 | Turgeman |
| 9,848,009 B2 | 12/2017 | Turgeman |
| 9,927,883 B1 | 3/2018 | Lin |
| 10,032,010 B2 | 7/2018 | Turgeman |
| 10,037,421 B2 | 7/2018 | Turgeman |
| 10,049,209 B2 | 8/2018 | Turgeman |
| 10,055,560 B2 | 8/2018 | Turgeman |
| 10,069,837 B2 | 9/2018 | Turgeman |
| 10,069,852 B2 | 9/2018 | Turgeman |
| 10,079,853 B2 | 9/2018 | Turgeman |
| 10,083,439 B2 | 9/2018 | Turgeman |
| 10,164,985 B2 | 12/2018 | Turgeman |
| 10,198,122 B2 | 2/2019 | Turgeman |
| 10,262,324 B2 | 4/2019 | Turgeman |
| 10,298,614 B2 | 5/2019 | Turgeman |
| 10,395,018 B2 | 8/2019 | Turgeman |
| 10,397,262 B2 | 8/2019 | Karabchevsky |
| 10,404,729 B2 | 9/2019 | Turgeman |
| 10,474,815 B2 | 11/2019 | Turgeman |
| 10,476,873 B2 | 11/2019 | Turgeman |
| 10,523,680 B2 | 12/2019 | Turgeman |
| 2001/0004733 A1 | 6/2001 | Eldering |
| 2002/0023229 A1 | 2/2002 | Hangai |
| 2002/0089412 A1 | 7/2002 | Heger |
| 2003/0033526 A1 | 2/2003 | French |
| 2003/0074201 A1 | 4/2003 | Grashey |
| 2003/0137494 A1 | 7/2003 | Tulbert |
| 2003/0212811 A1 | 11/2003 | Thornton |
| 2004/0015714 A1 | 1/2004 | Abraham |
| 2004/0017355 A1 | 1/2004 | Shim |
| 2004/0021643 A1 | 2/2004 | Hoshino |
| 2004/0034784 A1 | 2/2004 | Fedronic |
| 2004/0062423 A1 | 4/2004 | Doi |
| 2004/0111523 A1 | 6/2004 | Hall |
| 2004/0119682 A1* | 6/2004 | Levine .............. G06F 3/038 345/156 |
| 2004/0123156 A1 | 6/2004 | Hammond |
| 2004/0143737 A1 | 7/2004 | Teicher |
| 2004/0186882 A1 | 9/2004 | Ting |
| 2004/0221171 A1 | 11/2004 | Ahmed |
| 2005/0008148 A1 | 1/2005 | Jacobson |
| 2005/0060138 A1 | 3/2005 | Wang |
| 2005/0179657 A1 | 8/2005 | Russo |
| 2005/0289264 A1 | 12/2005 | Illowsky |
| 2006/0006803 A1 | 1/2006 | Huang |
| 2006/0080263 A1 | 4/2006 | Willis |
| 2006/0090073 A1 | 4/2006 | Steinberg |
| 2006/0123101 A1 | 6/2006 | Buccella |
| 2006/0143454 A1 | 6/2006 | Walmsley |
| 2006/0195328 A1 | 8/2006 | Abraham |
| 2006/0215886 A1 | 9/2006 | Black |
| 2006/0224898 A1 | 10/2006 | Ahmed |
| 2006/0238490 A1* | 10/2006 | Stanley .............. G06F 3/017 345/156 |
| 2006/0280339 A1 | 12/2006 | Cho |
| 2006/0282660 A1 | 12/2006 | Varghese |
| 2006/0284969 A1 | 12/2006 | Kim |
| 2007/0118804 A1 | 5/2007 | Raciborski |
| 2007/0156443 A1 | 7/2007 | Gurvey |
| 2007/0174082 A1 | 7/2007 | Singh |
| 2007/0183633 A1 | 8/2007 | Hoffmann |
| 2007/0214426 A1 | 9/2007 | Ruelle |
| 2007/0226797 A1 | 9/2007 | Thompson |
| 2007/0236330 A1 | 10/2007 | Cho |
| 2007/0240230 A1 | 10/2007 | O'Connell |
| 2007/0250920 A1* | 10/2007 | Lindsay .............. G06F 21/31 726/7 |
| 2007/0255821 A1 | 11/2007 | Ge |
| 2007/0266305 A1 | 11/2007 | Cong |
| 2007/0271466 A1 | 11/2007 | Mak |
| 2007/0283416 A1 | 12/2007 | Renaud |
| 2008/0046982 A1 | 2/2008 | Parkinson |
| 2008/0059474 A1 | 3/2008 | Lim |
| 2008/0068343 A1 | 3/2008 | Hoshino |
| 2008/0084972 A1 | 4/2008 | Burke |
| 2008/0091639 A1 | 4/2008 | Davis |
| 2008/0092209 A1 | 4/2008 | Davis |
| 2008/0092245 A1 | 4/2008 | Alward |
| 2008/0097851 A1 | 4/2008 | Bemmel |
| 2008/0098456 A1 | 4/2008 | Alward |
| 2008/0103799 A1* | 5/2008 | Domenikos ........ G06Q 30/0185 705/318 |
| 2008/0120717 A1 | 5/2008 | Shakkarwar |
| 2008/0136790 A1 | 6/2008 | Hio |
| 2008/0162449 A1 | 7/2008 | Chao-Yu |
| 2008/0183745 A1 | 7/2008 | Cancel |
| 2008/0192005 A1 | 8/2008 | Elgoyhen |
| 2008/0200310 A1 | 8/2008 | Tagliabue |
| 2008/0211766 A1 | 9/2008 | Westerman |
| 2008/0215576 A1 | 9/2008 | Zhao |
| 2008/0263636 A1 | 10/2008 | Gusler |
| 2008/0298588 A1 | 12/2008 | Shakkarwar |
| 2008/0301808 A1 | 12/2008 | Calo |
| 2008/0306897 A1 | 12/2008 | Liu |
| 2009/0037983 A1 | 2/2009 | Chiruvolu |
| 2009/0038010 A1 | 2/2009 | Ma |
| 2009/0089879 A1 | 4/2009 | Wang |
| 2009/0094311 A1 | 4/2009 | Awadallah |
| 2009/0132395 A1 | 5/2009 | Lam |
| 2009/0157792 A1 | 6/2009 | Fiatal |
| 2009/0172551 A1 | 7/2009 | Kane |
| 2009/0189736 A1 | 7/2009 | Hayashi |
| 2009/0199296 A1 | 8/2009 | Xie |
| 2009/0227232 A1 | 9/2009 | Matas |
| 2009/0241188 A1 | 9/2009 | Komura |
| 2009/0254336 A1 | 10/2009 | Dumais |
| 2009/0281979 A1 | 11/2009 | Tysowski |
| 2009/0293119 A1 | 11/2009 | Jonsson |
| 2009/0303204 A1 | 12/2009 | Nasiri |
| 2009/0320123 A1 | 12/2009 | Yu |
| 2010/0007632 A1 | 1/2010 | Yamazaki |
| 2010/0040293 A1 | 2/2010 | Hermann |
| 2010/0042387 A1 | 2/2010 | Gibbon |
| 2010/0042403 A1 | 2/2010 | Chandrasekar |
| 2010/0046806 A1 | 2/2010 | Baughman |
| 2010/0070405 A1 | 3/2010 | Joa |
| 2010/0077470 A1 | 3/2010 | Kozat |
| 2010/0082747 A1 | 4/2010 | Yue |
| 2010/0082998 A1 | 4/2010 | Kohavi |
| 2010/0115610 A1 | 5/2010 | Tredoux |
| 2010/0122082 A1 | 5/2010 | Deng |
| 2010/0125816 A1 | 5/2010 | Bezos |
| 2010/0138370 A1 | 6/2010 | Wu |
| 2010/0164897 A1 | 7/2010 | Morin |
| 2010/0171753 A1 | 7/2010 | Kwon |
| 2010/0197352 A1 | 8/2010 | Runstedler |
| 2010/0225443 A1 | 9/2010 | Bayram |
| 2010/0241859 A1* | 9/2010 | Osmolovsky ....... H03M 13/134 713/170 |
| 2010/0269165 A1 | 10/2010 | Chen |
| 2010/0281539 A1 | 11/2010 | Burns |
| 2010/0284532 A1 | 11/2010 | Burnett |
| 2010/0287229 A1 | 11/2010 | Hauser |
| 2010/0321304 A1 | 12/2010 | Rofougaran |
| 2010/0328074 A1 | 12/2010 | Johnson |
| 2011/0010209 A1 | 1/2011 | McNally |
| 2011/0012829 A1 | 1/2011 | Yao |
| 2011/0016320 A1 | 1/2011 | Bergsten |
| 2011/0016534 A1 | 1/2011 | Jakobsson |
| 2011/0018828 A1 | 1/2011 | Wu |
| 2011/0023115 A1 | 1/2011 | Wright |
| 2011/0029902 A1 | 2/2011 | Bailey |
| 2011/0039529 A1 | 2/2011 | Kim |
| 2011/0039602 A1 | 2/2011 | McNamara |
| 2011/0043475 A1 | 2/2011 | Rigazio |
| 2011/0050394 A1 | 3/2011 | Zhang |
| 2011/0063211 A1 | 3/2011 | Hoerl |
| 2011/0065504 A1 | 3/2011 | Dugan |
| 2011/0102570 A1 | 5/2011 | Wilf |
| 2011/0105103 A1* | 5/2011 | Ullrich .............. G06F 3/017 455/420 |
| 2011/0105859 A1 | 5/2011 | Popovic |

(56) References Cited

U.S. PATENT DOCUMENTS

| | | |
|---|---|---|
| 2011/0113388 A1 | 5/2011 | Eisen |
| 2011/0154273 A1 | 6/2011 | Aburada |
| 2011/0159650 A1 | 6/2011 | Shiraishi |
| 2011/0159850 A1 | 6/2011 | Faith |
| 2011/0162076 A1 | 6/2011 | Song |
| 2011/0191820 A1 | 8/2011 | Ivey |
| 2011/0193737 A1 | 8/2011 | Chiueh |
| 2011/0202453 A1 | 8/2011 | Issa |
| 2011/0221684 A1 | 9/2011 | Rydenhag |
| 2011/0223888 A1 | 9/2011 | Esaki |
| 2011/0225644 A1 | 9/2011 | Pullikottil |
| 2011/0246902 A1 | 10/2011 | Tsai |
| 2011/0248941 A1 | 10/2011 | Abdo |
| 2011/0251823 A1 | 10/2011 | Davis |
| 2011/0271342 A1 | 11/2011 | Chung |
| 2011/0276414 A1 | 11/2011 | Subbarao |
| 2011/0304531 A1 | 12/2011 | Brooks |
| 2011/0320822 A1 | 12/2011 | Lind |
| 2012/0005483 A1 | 1/2012 | Patvarczki |
| 2012/0005719 A1 | 1/2012 | McDougal |
| 2012/0007821 A1 | 1/2012 | Zaliva |
| 2012/0054834 A1 | 3/2012 | King |
| 2012/0096555 A1 | 4/2012 | Mahaffey |
| 2012/0102551 A1 | 4/2012 | Bidare |
| 2012/0113061 A1 | 5/2012 | Ikeda |
| 2012/0124662 A1 | 5/2012 | Baca |
| 2012/0133055 A1 | 5/2012 | Machida |
| 2012/0151559 A1 | 6/2012 | Koudys |
| 2012/0154173 A1 | 6/2012 | Chang |
| 2012/0154273 A1 | 6/2012 | McDade |
| 2012/0154823 A1 | 6/2012 | Sakamoto |
| 2012/0158503 A1 | 6/2012 | Mardikar |
| 2012/0159599 A1 | 6/2012 | Szoke |
| 2012/0164978 A1 | 6/2012 | Conti |
| 2012/0167170 A1 | 6/2012 | Shi |
| 2012/0167204 A1 | 6/2012 | Akka |
| 2012/0174213 A1 | 7/2012 | Geiger |
| 2012/0188198 A1 | 7/2012 | Jeong |
| 2012/0204257 A1 | 8/2012 | O'Connell |
| 2012/0218193 A1 | 8/2012 | Weber |
| 2012/0246737 A1 | 9/2012 | Paxton |
| 2012/0252410 A1 | 10/2012 | Williams |
| 2012/0278804 A1 | 11/2012 | Narayanasamy |
| 2012/0284380 A1 | 11/2012 | Anderson |
| 2013/0024239 A1 | 1/2013 | Baker |
| 2013/0036416 A1 | 2/2013 | Raju |
| 2013/0076650 A1 | 3/2013 | Vik |
| 2013/0088434 A1 | 4/2013 | Masuda |
| 2013/0097682 A1 | 4/2013 | Zeljkovic |
| 2013/0097706 A1 | 4/2013 | Titonis |
| 2013/0111586 A1 | 5/2013 | Jackson |
| 2013/0133055 A1 | 5/2013 | Ali |
| 2013/0135218 A1 | 5/2013 | Jain |
| 2013/0139248 A1 | 5/2013 | Rhee |
| 2013/0154999 A1 | 6/2013 | Guard |
| 2013/0162603 A1 | 6/2013 | Peng |
| 2013/0167212 A1 | 6/2013 | Azar |
| 2013/0212674 A1 | 8/2013 | Boger |
| 2013/0239195 A1 | 9/2013 | Turgeman |
| 2013/0239206 A1 | 9/2013 | Draluk |
| 2013/0254642 A1 | 9/2013 | Seo |
| 2013/0282637 A1 | 10/2013 | Costigan |
| 2013/0288647 A1 | 10/2013 | Turgeman |
| 2013/0305357 A1 | 11/2013 | Ayyagari |
| 2013/0312097 A1 | 11/2013 | Turnbull |
| 2013/0335349 A1 | 12/2013 | Ferren |
| 2014/0033317 A1 | 1/2014 | Barber |
| 2014/0041020 A1 | 2/2014 | Zhao |
| 2014/0078061 A1 | 3/2014 | Simons |
| 2014/0078193 A1 | 3/2014 | Barnhoefer |
| 2014/0082369 A1 | 3/2014 | Waclawsky |
| 2014/0111451 A1 | 4/2014 | Park |
| 2014/0118520 A1 | 5/2014 | Slaby |
| 2014/0143304 A1 | 5/2014 | Hegarty |
| 2014/0168093 A1 | 6/2014 | Lawrence |
| 2014/0196119 A1 | 7/2014 | Hill |
| 2014/0200953 A1 | 7/2014 | Mun |
| 2014/0250502 A1* | 9/2014 | Lauer .................. G06F 21/36 726/5 |
| 2014/0250538 A1 | 9/2014 | Rapaport |
| 2014/0259130 A1 | 9/2014 | Li |
| 2014/0270571 A1 | 9/2014 | Dwan |
| 2014/0283059 A1 | 9/2014 | Sambamurthy |
| 2014/0317028 A1 | 10/2014 | Turgeman |
| 2014/0317726 A1 | 10/2014 | Turgeman |
| 2014/0317734 A1 | 10/2014 | Valencia |
| 2014/0317744 A1 | 10/2014 | Turgeman |
| 2014/0325223 A1 | 10/2014 | Turgeman |
| 2014/0325645 A1 | 10/2014 | Turgeman |
| 2014/0325646 A1 | 10/2014 | Turgeman |
| 2014/0325682 A1 | 10/2014 | Turgeman |
| 2014/0337786 A1 | 11/2014 | Luo |
| 2014/0344927 A1 | 11/2014 | Turgeman |
| 2015/0002479 A1 | 1/2015 | Kawamura |
| 2015/0012920 A1 | 1/2015 | De Santis |
| 2015/0062078 A1 | 3/2015 | Christman |
| 2015/0091858 A1 | 4/2015 | Rosenberg |
| 2015/0094030 A1 | 4/2015 | Turgeman |
| 2015/0101031 A1 | 4/2015 | Harjanto |
| 2015/0146945 A1 | 5/2015 | Han |
| 2015/0205944 A1 | 7/2015 | Turgeman |
| 2015/0205955 A1 | 7/2015 | Turgeman |
| 2015/0205957 A1 | 7/2015 | Turgeman |
| 2015/0205958 A1 | 7/2015 | Turgeman |
| 2015/0212843 A1 | 7/2015 | Turgeman |
| 2015/0213244 A1 | 7/2015 | Lymberopoulos |
| 2015/0213246 A1 | 7/2015 | Turgeman |
| 2015/0213251 A1 | 7/2015 | Turgeman |
| 2015/0256528 A1 | 9/2015 | Turgeman |
| 2015/0256556 A1 | 9/2015 | Kaminsky |
| 2015/0264572 A1 | 9/2015 | Turgeman |
| 2015/0268768 A1 | 9/2015 | Woodhull |
| 2015/0310196 A1 | 10/2015 | Turgeman |
| 2016/0006800 A1 | 1/2016 | Summers |
| 2016/0012465 A1 | 1/2016 | Sharp |
| 2016/0034673 A1 | 2/2016 | Chandra |
| 2016/0042164 A1 | 2/2016 | Goldsmith |
| 2016/0077620 A1 | 3/2016 | Choi |
| 2016/0109969 A1 | 4/2016 | Keating |
| 2016/0132105 A1 | 5/2016 | Turgeman |
| 2016/0164905 A1 | 6/2016 | Pinney Wood |
| 2016/0164906 A1 | 6/2016 | Pinney Wood |
| 2016/0174044 A1 | 6/2016 | Jones |
| 2016/0179245 A1 | 6/2016 | Johansson |
| 2016/0191237 A1 | 6/2016 | Roth |
| 2016/0196414 A1 | 7/2016 | Stuntebeck |
| 2016/0197918 A1 | 7/2016 | Turgeman |
| 2016/0209948 A1 | 7/2016 | Tulbert |
| 2016/0226865 A1 | 8/2016 | Chen |
| 2016/0294837 A1 | 10/2016 | Turgeman |
| 2016/0300054 A1 | 10/2016 | Turgeman |
| 2016/0306974 A1 | 10/2016 | Turgeman |
| 2016/0307191 A1 | 10/2016 | Turgeman |
| 2016/0307201 A1 | 10/2016 | Turgeman |
| 2016/0321445 A1 | 11/2016 | Turgeman |
| 2016/0321689 A1 | 11/2016 | Turgeman |
| 2016/0328572 A1* | 11/2016 | Valacich .............. A61B 5/7475 |
| 2016/0342826 A1 | 11/2016 | Apostolos |
| 2016/0344783 A1 | 11/2016 | Kushimoto |
| 2016/0364138 A1 | 12/2016 | Luo |
| 2016/0366177 A1 | 12/2016 | Turgeman |
| 2016/0371476 A1 | 12/2016 | Turgeman |
| 2017/0011217 A1 | 1/2017 | Turgeman |
| 2017/0012988 A1 | 1/2017 | Turgeman |
| 2017/0017781 A1 | 1/2017 | Turgeman |
| 2017/0032114 A1 | 2/2017 | Turgeman |
| 2017/0034210 A1 | 2/2017 | Talmor |
| 2017/0048272 A1 | 2/2017 | Yamamura |
| 2017/0054702 A1 | 2/2017 | Turgeman |
| 2017/0076089 A1 | 3/2017 | Turgeman |
| 2017/0085587 A1 | 3/2017 | Turgeman |
| 2017/0090418 A1 | 3/2017 | Tsang |
| 2017/0091450 A1 | 3/2017 | Turgeman |
| 2017/0126735 A1 | 5/2017 | Turgeman |

(56) References Cited

U.S. PATENT DOCUMENTS

| | | | |
|---|---|---|---|
| 2017/0140279 A1 | 5/2017 | Turgeman |
| 2017/0149958 A1 | 5/2017 | Xian |
| 2017/0154366 A1 | 6/2017 | Turgeman |
| 2017/0193526 A1 | 7/2017 | Turgeman |
| 2017/0195354 A1 | 7/2017 | Kesin |
| 2017/0195356 A1 | 7/2017 | Turgeman |
| 2017/0221064 A1 | 8/2017 | Turgeman |
| 2017/0302340 A1 | 10/2017 | Berlin |
| 2017/0364919 A1 | 12/2017 | Ranganath |
| 2018/0012003 A1 | 1/2018 | Asulin |
| 2018/0012227 A1 | 1/2018 | Tunnell |
| 2018/0034850 A1 | 2/2018 | Turgeman |
| 2018/0095596 A1 | 4/2018 | Turgeman |
| 2018/0103047 A1 | 4/2018 | Turgeman |
| 2018/0107836 A1 | 4/2018 | Boger |
| 2018/0115899 A1 | 4/2018 | Kedem |
| 2018/0121640 A1 | 5/2018 | Turgeman |
| 2018/0160309 A1 | 6/2018 | Turgeman |
| 2018/0314816 A1 | 11/2018 | Turgeman |
| 2018/0349583 A1 | 12/2018 | Turgeman |
| 2018/0350144 A1 | 12/2018 | Rathod |
| 2018/0351959 A1 | 12/2018 | Turgeman |
| 2019/0028497 A1 | 1/2019 | Karabchevsky |
| 2019/0057200 A1 | 2/2019 | Sabag |
| 2019/0121956 A1 | 4/2019 | Turgeman |
| 2019/0156034 A1 | 5/2019 | Kedem |
| 2019/0158535 A1 | 5/2019 | Kedem |
| 2019/0220863 A1 | 7/2019 | Novick |
| 2019/0272025 A1 | 9/2019 | Turgeman |
| 2019/0342328 A1 | 11/2019 | Rivner |
| 2019/0342329 A1 | 11/2019 | Turgeman |

FOREIGN PATENT DOCUMENTS

| | | |
|---|---|---|
| EP | 2477136 | 7/2012 |
| EP | 2477136 A1 | 7/2012 |
| EP | 2610776 | 7/2013 |
| EP | 2610776 A2 | 7/2013 |
| EP | 2646904 B1 | 8/2018 |
| EP | 3019991 B1 | 2/2019 |
| ES | 2338092 A1 | 5/2010 |
| WO | 2005099166 | 10/2005 |
| WO | 2005099166 A2 | 10/2005 |
| WO | 2007146437 | 12/2007 |
| WO | 2007146437 A2 | 12/2007 |
| WO | 2012073233 | 6/2012 |
| WO | 2012073233 A1 | 6/2012 |

OTHER PUBLICATIONS

Stinson et al., "Characterizing Bots' Remote Control Behavior". Detection of Intrusions and Malware, and Vulnerability Assessment. Springer Berlin Heidelberg, p. 89-108. Dec. 31, 2007.

Todorov, "Optimally Principles in Sensorimotor Control (Review)", Sep. 2004, Nature Neuroscience 7, pp. 907-915.

Zheng et al., "An Efficient User Verification System via Mouse Movements", Oct. 17-21, 2011, CCS' 11, Chicago, Illinois.

Garfinkel and Rosenblum, "A virtual Machine Introspection-Based Architecture for Intrusion Detection.", 2003, Proc. Network and Distributed Systems Security Symp., The Internet Society, pp. 191-206.

Faisal Alkhateeb et al., "Bank Web Sites Phishing Detection and Notification System Based on Semantic Web technologies", International Journal of Security and its Applications 6(4):53-66, Oct. 2012.

Sungzoon Cho et al., "Artificial Rhythms and Cues for Keystroke Dynamics Based Authentication", International Conference on Biometrics (ICB)—Advances in Biometrics, pp. 626-632, year 2006.

International Search Report for PCT/IB2017/055995, dated Feb. 15, 2018.

Written Opinion of the International Search Authority for PCT/IB2017/055995, dated Feb. 15, 2018.

Supplementary European Search Report for application 11844440 dated Nov. 17, 2017.

International Search Report for application PCT/IB2016/054064 dated Nov. 21, 2016.

International Search Report for application PCT/IB2014/062941 dated Dec. 17, 2014.

International Search Report for application PCT/IB2014/062293 dated Oct. 1, 2014.

International Search Report for application PCT/IL2011/000907 dated Apr. 19, 2012.

Nakkabi et al., "Improving Mouse Dynamics Biometric Performance Using Variance Reduction via Extractors with Separate Features", Nov. 2010, IEEE Transactions on System, Man, and Cybernetics; vol. 40, No. 6.

Nance et al., "Virtual Machine Introspection", IEEE Security & Privacy, 2008.

Garfinkel and Rosenblum, "A virtual Machine Introspection-Based Architecuture for Intrusion Detection.", 2003, Proc. Network and Distributed Systems Security Symp., The Internet Society, pp. 191-206.

Spafford et al., "Software Forensics: Can We Track Code to its Authors?", Feb. 1992, Computer Science Technical Report, Purdue e-Pubs, Report No. CSD-TR-92-010.

Tavis Ormandy, "An Empirical Study into the Security Exposure to Hosts of Hostile Virtualized Environments", retrieved from the Internet on May 3, 2017, from: http://taviso.decsystem.org/virtsec.pdf.

Zheng et al., "An Efficienct User Verification System via Mouse Movements", Oct. 17-21, 2011, CCS' 11, Chicago, Illinois.

Liston et al., "On the Cutting Edge: Thwarting Virtual Machine Detection"; retrieved from the Internet on May 3, 2017, from: http://docplayer.net/9791309-On-the-cutting-edge-thwarting-virtual-machine-detection.html.

Georgia Frantzeskou et al., "Identifying Authorship by Byte-Level N-Grams: The source Code Author Profile (SCAP) Method", Spring 2007, International Journal of Digital Evidence, vol. 6, issue 1.

Franklin et al., "Remote Detection of Virtual Machine Monitors with Fuzzy benchmarking", ACM SIGOPS Operating Systems Review, V42, Issue 3, Apr. 2008.

Emmanouil Vasilomanolakis, "A honeypot-driven cyber incident monitor: Lessons learned and steps ahead"; Sep. 2015; SIN '15: Proceedings of the 8th International Conference on Security of Information and Networks; Publisher: ACM; pp. 1-7.

International Search Report for PCT international application PCT/IL2018/051246, dated Mar. 11, 2019.

Written Opinion of the International Searching Authority for PCT international application PCT/IL2018/051246, dated Mar. 11, 2019.

Written Opinion of the International Searching Authority for PCT international application PCT/IL2011/000907, dated Apr. 19, 2012.

Written Opinion of the International Searching Authority for PCT international application PCT/IB2014/062293, dated Oct. 1, 2014.

Written Opinion of the International Searching Authority for PCT international application PCT/IB2014/062941, dated Dec. 17, 2014.

Written Opinion of the International Searching Authority for PCT international application PCT/IB2016/054064, dated Jul. 9, 2015.

Syed Ahsan Abbas et al., "What is the difference between a rooted and unrooted Android?" Quora.com, dated Jul. 22, 2016, printed on Aug. 12, 2019 from: www.Quora.com/What-is-the-difference-between-a-rooted-and-unrooted-Android.

Sebastian Lindstrom, "Getting to know asynchronous JavaScript: Callbacks, Promises and Async / Await", Medium.com, dated Jul. 2, 2017, printed on Aug. 12, 2019 from: Medium.com/codebuddies/getting-to-know-asynchronous-javascipt-callbacks-promises-and-async-await-17e0673281ee.

Ahmed et al., "A New Biometric Technology Based on Mouse Dynamics", Jul.-Sep. 2007, IEEE Transactions on Dependable and Secure Computing, vol. 4, No. 3, pp. 165-179.

Bailey, Kyle O., "Computer Based Behavioral Biometric Authentication via Multi-Modal Fusion", Thesis, 2013, Air Force Insitute of Technology.

(56) References Cited

OTHER PUBLICATIONS

Elizabeth Stinson and John C. Mitchell, "Characterizing the Remote Control Behavior of Bots", Detection of Intrusions and Malware, and Vulnerability Assessment. Springer Berlin Heidelberg, p. 89-108. Dec. 31, 2007.
Todorov, "Optimality Principles in Sensorimotor Control (Review)", Sep. 2004, Nature Neuroscience 7, pp. 907-915.
Cleeff et al., "Security Implications of Virtualization: A Literature Study", Science and Engineering, 2009.
Hibbeln et al., "Detecting Deception in Online Environments: Measuring Fraud Through Mouse Cursor Movements", Jun. 7, 2014, Gmunden Retreat on NeuroIS 2014 Gmunden Austria, p. 38.
Ferrie Peter, "Attack on Virtual Machine Emulators", Symantec Technology Exchange, 2007.
Yampolskiy et al., "Behavioural Biometrics: a survey and classification", 2008, International Journal of Biometrics, vol. 1, No. 1, pp. 81-113.
Provos et al., 2007, "The Ghost in the Browser: Analysis of Web-based Malware".
Huang Yao-Wen et al., "Web application security assessment by fault injection and behavior monitoring", 2003, Proceedings of the 12th international conference on World Wide Web, ACM.
Ben Hansen, "The Blur Busters Mouse Guide", dated Feb. 1, 2014; printed from the Internet on Aug. 5, 2019 from: https://www.blurbusters.com/faq/mouse-guide/.
Chris Cain, "Analyzing Man-in-the-Browser (MITB) Attacks", dated Dec. 2014; downloaded from the Internet on Aug. 5, 2019 from: https://www.sans.org/reading-room/whitepapers/forensics/analyzing-man-in-the-browser-mitb-attacks-35687.

\* cited by examiner

METHOD, DEVICE, AND SYSTEM OF DETECTING A LIE OF A USER WHO INPUTS DATA

CROSS-REFERENCE TO RELATED APPLICATIONS

This application is a Continuation-In-Part (CIP) of U.S. Ser. No. 14/675,764, which is hereby incorporated by reference in its entirety.

The above-mentioned U.S. Ser. No. 14/675,764 claims benefit and priority from U.S. 61/973,855, which is hereby incorporated by reference in its entirety.

The above-mentioned U.S. Ser. No. 14/675,764 is a Continuation-in-Part (CIP) of U.S. Ser. No. 14/566,723, now U.S. Pat. No. 9,071,969; which is a Continuation of U.S. Ser. No. 13/922,271, now U.S. Pat. No. 8,938,787; which is a Continuation-in-Part (CIP) of U.S. Ser. No. 13/877,676, now U.S. Pat. No. 9,069,942; which is a National Stage of PCT/IL2011/000907; which claims priority and benefit from U.S. 61/417,479; all of which are hereby incorporated by reference in their entirety.

The above-mentioned U.S. Ser. No. 14/675,764 is a Continuation-in-Part (CIP) of U.S. Ser. No. 14/320,653, now U.S. Pat. No. 9,275,337; which claims priority and benefit from U.S. 61/843,915; all of which are hereby incorporated by reference in their entirety.

The above-mentioned U.S. Ser. No. 14/675,764 is a Continuation-in-Part (CIP) of U.S. Ser. No. 14/320,656, now U.S. Pat. No. 9,665,703; which claims priority and benefit from U.S. 61/843,915; all of which are hereby incorporated by reference in their entirety.

The above-mentioned U.S. Ser. No. 14/675,764 is a Continuation-in-Part (CIP) of U.S. Ser. No. 14/325,393, now U.S. Pat. No. 9,531,733; which claims priority and benefit from U.S. 61/843,915; all of which are hereby incorporated by reference in their entirety.

The above-mentioned U.S. Ser. No. 14/675,764 is a Continuation-in-Part (CIP) of U.S. Ser. No. 14/325,394, now U.S. Pat. No. 9,547,766; which claims priority and benefit from U.S. 61/843,915; all of which are hereby incorporated by reference in their entirety.

The above-mentioned U.S. Ser. No. 14/675,764 is also a Continuation-in-Part (CIP) of U.S. Ser. No. 14/325,395, now U.S. Pat. No. 9,621,567; which claims priority and benefit from U.S. 61/843,915; all of which are hereby incorporated by reference in their entirety.

The above-mentioned U.S. Ser. No. 14/675,764 is also a Continuation-in-Part (CIP) of U.S. Ser. No. 14/325,396; which claims priority and benefit from U.S. 61/843,915; all of which are hereby incorporated by reference in their entirety.

The above-mentioned U.S. Ser. No. 14/675,764 is a Continuation-in-Part (CIP) of U.S. Ser. No. 14/325,397, now U.S. Pat. No. 9,450,971; which claims priority and benefit from U.S. 61/843,915; all of which are hereby incorporated by reference in their entirety.

The above-mentioned U.S. Ser. No. 14/675,764 is a Continuation-in-Part (CIP) of U.S. Ser. No. 14/325,398, now U.S. Pat. No. 9,477,826; which claims priority and benefit from U.S. 61/843,915; all of which are hereby incorporated by reference in their entirety.

FIELD

The present invention is related to the security of electronic devices and systems.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

Some activities may be privileged, or may require authentication of the user in order to ensure that only the authorized user engages in the activity. For example, a user may be required to correctly enter his username and his password in order to access his email account, or in order to access his online banking interface or website.

SUMMARY

The present invention may include, for example, systems, devices, and methods for detecting the identity of a user of an electronic device or system; for determining whether or not an electronic device or system is being used by a fraudulent user (or an attacker) or by a legitimate user; for differentiating among users of a computerized service or among users of an electronic device; and/or for detecting that a user of an electronic device or electronic system is currently entering, or has recently or previously entered, data or input that are incorrect, or fraudulent, or dishonest, or untrue, or "beautified", or exaggerated, or rounded-up, or rounded-down, or that include a lie, or that are false.

The present invention may include methods, devices, and systems of detecting a lie of a user who inputs data. A method includes monitoring input-unit gestures and interactions of a user that inputs data through an electronic device; and based on analysis of the input-unit gestures and interactions, determining that the user has inputted false data through the electronic device. A particular fillable field, or a particular question, are identified as having untrue input from the user. Optionally, spatial orientation data of the electronic device is taken into account in the determination process. Optionally, contextual analysis is utilized, to determine that the input-unit gestures and interactions reflect an attempt of the user to perform a beautifying modification of a data-item to his benefit.

The present invention may provide other and/or additional benefits or advantages.

DETAILED DESCRIPTION OF THE PRESENT INVENTION

The Applicants have realized that even a legitimate user, who is not necessarily a cyber-attacker, may sometimes lie or be untruthful or dishonest when he or she enters data into a computerized service or fills-out an online form; or may otherwise provide or enter incorrect information, inaccurate information, exaggerated information, "beautified" information, or the like.

The Applicants have realized that this type of fraudulent data-entry may be performed by a legitimate user, who operates or accesses or utilizes his true identity and/or his true credentials (username, password) and/or his true online asset or online service (e.g., bank account, brokerage account, email account), for various purposes that are not necessarily fraudulent in their nature; such as, in order to save time or efforts for the user in his attempt to complete an certain online transaction; or in order to otherwise improve the chances of the legitimate user completing the transaction; or for other reasons, such as due to privacy concerns (e.g., a user may be reluctant to provide to the system his real, accurate, data; and therefore the user modifies the data slightly and provides to the system "modified" data, exaggerated data, rounded data, beautified data, or the like).

Figure 1:
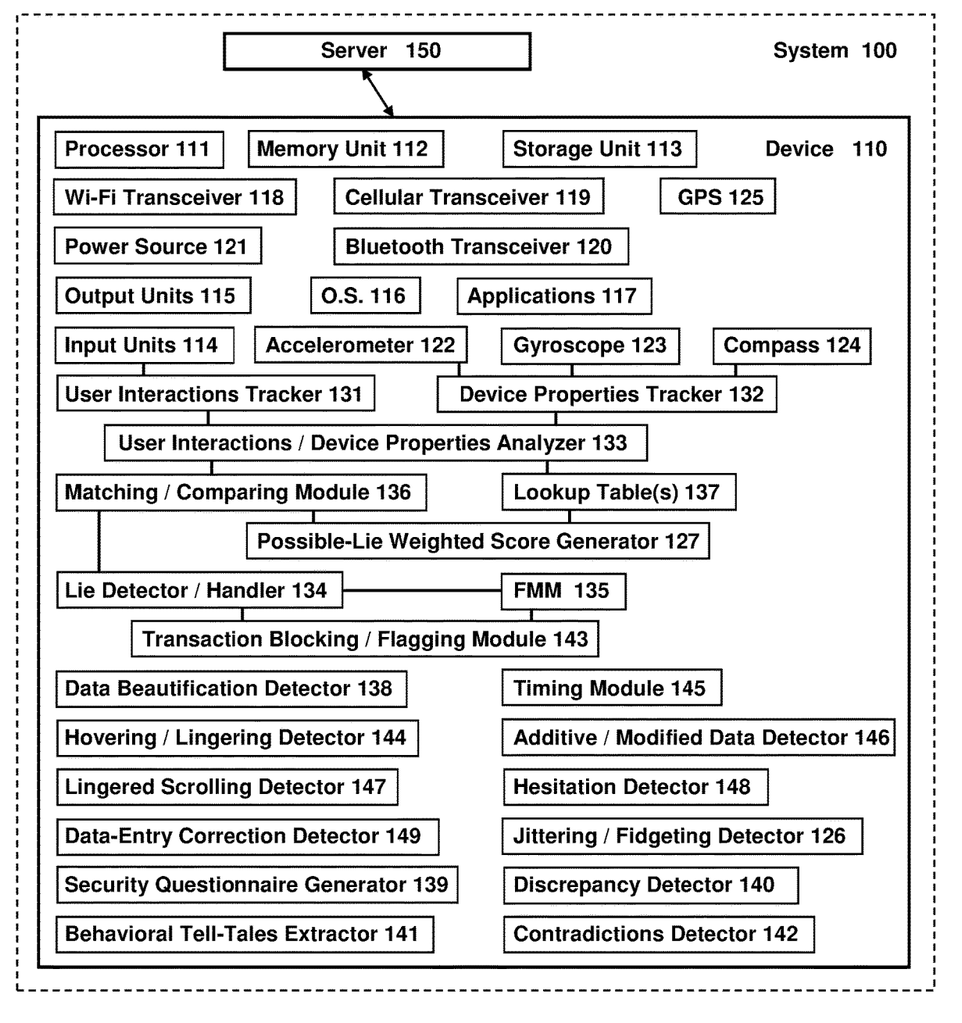
FIG. 1 is a schematic block-diagram illustration of a system, in accordance with some demonstrative embodiments of the present invention.

Reference is made to FIG. 1, which is a schematic block-diagram illustration of a system 100, in accordance with some demonstrative embodiments of the present invention. System 100 may comprise, for example, an end-user device 110 able to communicate with a server 150 of a computerized service.

As non-limiting examples, end-user device 110 may be a laptop computer, a desktop computer, a smartphone, a tablet, a smart-watch, or other electronic device and/or portable device and/or non-portable device. End-user device 110 may comprise, for example, a processor 111 to execute code or programs or instructions; a memory unit 112 to temporarily store data (e.g., RAM, Flash memory); a storage unit 113 to store data long-term (e.g., Hard Disk Drive (HDD), Solid State Drive (SSD), Flash memory); one or more input units 114 (e.g., touch-screen, physical keyboard, physical keypad, on-screen keyboard, on-screen keypad, computer mouse, trackball, joystick, touch-pad, stylus, pointing device, acoustic microphone); one or more output units 115 (e.g., screen, touch-screen, multi-touch screen, display unit, audio speakers); an Operating System (OS) 116; one or more applications 117; a Wi-Fi transceiver 118; optionally, a cellular transceiver 119; optionally, a Bluetooth transceiver 120; a power source 121 (e.g., internal battery, external battery, rechargeable battery, connection to an electric power outlet or socket); one or more accelerometers 122; one or more gyroscopes 123; one or more compass units 124; a Global Positioning System (GPS) unit 125; one or more other sensors, such as location-based sensors, location-detecting sensors, spatial orientation sensors or detectors, device slanting sensors or detectors, or the like; or and/or other suitable units or modules.

As non-limiting examples, server 150 may be a web-server or an application-server of a banking system, a brokerage system, a system that provides loans or mortgages or credit or other financial services, a retailer or e-commerce seller, a dating or match-making website, a social network, or the like. Server 150 may be implemented by using similar components to those of end-user device 110, for example, processor, storage unit, input unit, output unit, transceivers, and so forth.

A user interactions tracker 131 may monitor and/or track all the user interactions and/or gestures that are performed by the user via one or more input-unit(s) of the end-user device. It may be implemented as a client-side (end-user side) module or unit, and/or as a server-side module or unit. For example, it may be implemented as or using JavaScript code and/or CSS code and/or HTML5 code, which may be included in or embedded in or called from one or more HTML page(s) that are served by server 150 to a Web-browser of end-user device 110; or, it may be implemented as integral part of, or as an extension or add-on or plug-in to, a web-browser running on end-user device 110; or, it may be implemented as part of the native code or the native programming language of an application or "app" that runs on end-user device 110 (e.g., implemented as integral or internal part of the native program code of a banking "app" or mobile application).

The tracked user-interactions data and/or the tracked input-unit(s) interactions data, may be logged or stored locally within device 110, and/or remotely in server 150; in conjunction with time/date stamps, and optionally in conjunction with contextual data indicating in which context they were measured or sensed or monitored (e.g., movement of the computer-mouse 75 pixels sideways was monitored at a particular time/date stamp, and contextually in the web-page of "apply for a new credit card", and more particularly in the context of moving the on-screen pointer from the field of "First Name" to the field of "Last Name").

A device properties tracker 132 may monitor and/or track particular features and/or properties of the end-user device 110, and/or of a particular unit of device 110; for example, readings or measurements or data sensed by accelerometer (s) 122, by gyroscope(s) 123, by compass unit(s) 124, by GPS unit 125, by device spatial-orientation sensor(s), and/or by other sensors of device 110.

The tracked device properties may be logged or stored locally within device 110, and/or remotely in server 150; in conjunction with time/date stamps, and optionally in conjunction with contextual data indicating in which context they were measured or sensed or monitored (e.g., spatial rotation of the entire device 110 by 45 degrees towards the ground was monitored at a particular time/date stamp, and contextually while the user was viewing the web-page of "apply for a new credit card", and more particularly while the user was scrolling-down through a list of options in a drop-down list of answers to the question "What is your age range").

The monitored user-interactions data, and/or the monitored device properties data, may be analyzed by a User Interactions/Device Properties Analyzer Module 133; which may be implemented locally within device 110 and/or remotely in server 150; and which may perform or execute one or more of the methods described herein in order to detect, identify and/or estimate that a particular data-item that was entered or selected by the user, or a particular set or page of such data-items, is certainly a lie, or certainly includes a lie or untrue information, or more-probably or most-probably includes a lie or untrue information; and/or in order to particularly point out a certain field or data-item or user selection that is estimated to be dishonest or untrue or a lie. Based on the analysis performed by the User Interactions/Device Properties Analyzer Module 133, a Lie Detector/Handler module 134 may operate to generate a fraud alert or a fraud notification, or to generate a "Lie Detected" notification or alert, or to flag the transaction that the user is attempting to perform as a possible-fraud or as containing a lie or multiple lies or as requiring additional scrutiny and/or manual review by a fraud analyst. Optionally, a Fraud Mitigation Module (FMM) 135 may be triggered to operate, by the Lie Detector/Handler module 134 and/or by the User Interactions/Device Properties Analyzer Module 133; for example, generating a notification to a system administrator about the detected or estimated lie, and/or blocking or stopping or denying the transaction that was attempted by the user, and/or generating a requirement for the user to perform additional operations (e.g., to contact telephonically a customer service representative).

It is noted that the Fraud Mitigation Module (FMM) 135, the Lie Detector/Handler module 134, and/or the User Interactions/Device Properties Analyzer Module 133, may be implemented as a single module or unit, or as a client-side (end-user side) unit or module, or as a server-side unit or module, or as combined or hybrid client-and-server modules or units; and such modules, or some of them, may perform locally and/or remotely one or some or all of the operations that are described herein. Additionally or alternatively, these unit(s) and/or module(s) may be implemented as part of, or as being combined with, a Matching/Comparing Module 136 able to perform one or more comparisons between (I) sensed data and/or analyzed data, and (II) pre-defined threshold value(s) and/or range(s); which may optionally utilize one or more lookup table(s) 137 of such pre-defined threshold value(s) and/or range(s).

In accordance with a first demonstrative embodiment of the present invention, the Applicants have realized that a legitimate user (e.g., not a cyber-attacker, not an impostor) may provide incorrect or exaggerated or "rounded up" or "rounded down" or "beautified" information, when filling-out an online application for a credit card, or for a loan or mortgage, or for a line-of-credit, or for opening a bank account or a brokerage account, or for requesting an increase of credit limit, or for submitting an application or a request to a financial institution. For example, the application form may ask the user Adam "What is your annual income from employment"; and although user Adam gains employment income of 68,700 Dollars, user Adam may actually input 70,000 Dollars or 76,000 Dollars as his response.

The Applicants have realized that the reason(s) for such "lie" or "exaggerated information" or "rounded up" information or "beautified information" may vary, and/or such reason(s) may exist even if the user Adam is a generally-honest person. For example, user Adam may not remember precisely his exact annual income, and may thus "round it up" to the nearest 1,000 or 10,000 dollars; or, user Adam may believe that by slightly rounding-up his income he might increase his chances of getting a positive response (approval) to his application; and/or user Adam may believe that a small exaggeration, such as by 5 or 10 percent upwardly, will not be detected or noticed by the computerized service, or will be ignored by the system, or the like. Similarly, when user Adam is asked in the application "what is your monthly mortgage payment", he may choose to "lie" slightly by rounding-down the actual number, from the real number (e.g., 2,150 Dollars per month) to a reduced number (e.g., 2,000 Dollars per month).

Some embodiments may thus utilize a contextual mechanism or a contextual analysis engine or a lookup table, which may indicate, for a particular data-item or field or GUI element, whether a correction of the data or a switch of the selection is, generally, to the benefit of the user (a "beautifying" correction), or is neutral, or is even derogatory to the user. For example, a Data Beautification Detector 138 may utilize a lookup table or a set of rules that indicate that: for the field of Annual Income, a data correction that Increases the income is a "beautifying" correction that attempts to improve the user's chances of receiving a benefit, and therefore such manual correction, if observed (e.g., the user changes his Annual Income data-item from 67,500 Dollars to 73,000 Dollars), indicates a Lie or an untrue data-item; whereas a data correction that Decreases the income (e.g., the user changes hi Annual Income data-item from 74,000 Dollars to 72,600 Dollars) is non-beautifying by its nature and therefore such manual correction does not trigger a Lie or untrue item notification. In another example, the Data Beautification Detector 138 may utilize a lookup table or a set of rules that indicate that, for the field of "how many dependent persons live in your household" in a mortgage loan application, a change from "4 dependents" to "2 dependents" is a beautifying correction that indicates a Lie as it corrects the data towards a result that is more beneficial to the user; whereas, a manual change of the data from "1 dependent" to "3 dependents" is a non-beautifying correction that does not trigger a Lie detection for this field in this form. Other suitable conditions or criteria may be used, to provide contextual parameters to information that is entered and/or modified.

In a second demonstrative example that may be referred to as "Business Email Compromise" or "Business Email Fraud", the Applicants have realized that a legitimate user (e.g., not a cyber-attacker, not an impostor) may provide incorrect responses and even blatantly-incorrect responses or outright lies to a security-oriented online questionnaire, for the purpose of attempting to speed-up the approval of an online transaction that he is attempting to perform. For example, Bob works in the Accounts Payable department of a Company; Bob receives through the corporate email system an email that appears to come from the Chief Executive Officer (CEO) of that Company, in which the CEO is commanding or requesting from Bob to urgently perform a wire transfer of 45,000 Dollars to a particular Vendor Malory for an urgent project. However, Bob does not know that the email did not actually originate or come from the CEO; but rather, the email is a fraudulent email from cyber-attacker Malory who posed as the CEO of Company and send to Bob the fraudulent instruction. Bob obeys the email from his CEO, and logs-in correctly to the corporate bank account of Company, that he is authorized to access as part of his job. The banking website receives Bob's commands to perform the wire transfer to Malory; however, a fraud-detection system of the bank triggers additional security questions, since the bank's system detects that this is a significant amount (e.g., over a pre-defined threshold value) that is requested to be paid to a new recipient that was never before paid by that Company.

Therefore, the server 150 that runs and serves the banking website generates and serves to Bob an online questionnaire, or a step-by-step "wizard" or series of questions, or a pop-up window or layer with a questionnaire, in an attempt to ensure that precautions were taken by Bob. For example, the banking website may firstly ask Bob, "Did you receive the request to this payment via Email?", to which Bob responds with "yes" (correct and truthful answer); then, the banking website may ask Bob, "Did you obtain phone confirmation from your superior in Company to do this transaction?", and Bob may decide to answer un-truthfully with a "yes" answer even though he did not actually request phone confirmation from the CEO, for example, since Bob has many tasks to perform and he wants to hasten the current task of performing the wire transfer, or because the CEO is not available by phone for a few hours, or the like. Similarly, the banking website may ask Bob, as a security precaution, "Did you confirm by phone today, with the intended recipient, that these are indeed his correct bank account details?", and again Bob may intentionally lie and respond with a "yes" in order to finish the transaction; as after all, Bob truly believes that he received a real email from his CEO commanding him to perform a certain transaction, and thus Bob does not hesitate to lie to the security-oriented questionnaire that only "blocks" or "delays" Bob from doing his job, in his view. It is noted that such additional security questionnaire may be generated by the system, either locally within the end-user device 110 (e.g., by a local Security Questionnaire Generator 139 within the device 110) or by the remote server 150.

In a third demonstrative example, user Carl fills-out an online banking form or application, and has to select his annual income from a drop-down menu of ranges, such as, "from 50,000 to 59,999 Dollars", or "from 60,000 to 69,999 Dollars", or "from 70,000 to 79,999 Dollars", and so forth; and although the actual (true) income of user Carl is 67,500 Dollars, user Carl may select the range of "70,000 to 79,999 Dollars" when entering his response, in order to beautify, even though it is clearly the incorrect answer from the possible choices.

In a fourth demonstrative example, user David fills-out an online profile in a dating or matchmaking website or application. However, instead of entering his true height (5 feet and 6 inches), user David beautifies the data and enters an increased height (e.g., 5 feet and 8 inches). Similarly, when entering his weight, user David may round-down his weight or may intentionally reduce the value of his weight, from the actual weight value (e.g., 176 pounds) to a reduced (and incorrect, or un-truthful) weight value (e.g., 170 pounds, or 166 pounds). Similarly, when user David has to select his annual income from a drop-down menu of ranges of income, he may select an "increased" range that is greater than his actual (true) range of income.

The Applicants have also realized that such or similar untruthful responses or untruthful data may be entered by legitimate users in other situations, for example, filling-out an online application to purchase insurance; filing an insurance claim; filling-out an application for government benefits or for employment-based benefits; a job application; a college or university application; filling-out a profile on a social network website or app; or the like.

The Applicants have further realized that in some situations, incorrect or rounded data or un-truthful data that was provided by a user, can later be compared to real data or to correct data or to verified data that may be obtained from (or generated by) other source(s) and/or from the user himself. For example, the user entered untruthful data of earning "75,000 Dollars", but his credit report or other data from a credit bureau indicates that he is actually earning only 64,000 Dollars. Additionally or alternatively, data obtained from his employer, or for the user himself (e.g., in response to a request to upload his latest pay-stub or salary paycheck), or from other sources (e.g., payroll company), or from previous or other applications filled-out by the user (e.g., at a different bank, or at a different website), may similarly indicate that the user-inputted data is incorrect or is a lie, and that it differs (slightly or significantly) from the real-life data or the true data. Additionally or alternatively, the system may request the user to call a customer service representative, who may ask the user the same question over the phone and may receive telephonically from the user an answer that is different from the data that the user had inputted manually to the system earlier on that day or earlier that month; again indicating to the system that the inputted data was untrue.

In accordance with the present invention, such "discrepancies" between (i) user-inputted data and (ii) the actual data (real data, true data), may be detected by a Discrepancy Detector unit or module 140 quite frequently, particularly at certain type of websites and/or applications and/or consumer requests (e.g. credit request, loan application); in a manner that enables a computerized system to collect a sufficiently-large base of such data, and to derive from it particular behavioral traits that are common to users that provide untruthful data, via a Behavioral Tell-Tales Extractor unit or module 141.

In some embodiments, a particular security-oriented or a fraud-prevention questionnaire may be generated and presented to the user, and the user's interactions with such questionnaire may be analyzed in order to detect untrue answers or to estimate the likelihood of fraudulent responses. In a first example, a lengthy questionnaire may be used, optionally spanning multiple pages or windows or stages; question number 2 may ask the user "did you receive the initial request for this wire transfer by email from Vendor?", and the user may answer "yes"; and a few screens later, question number 5 may ask the user "is it true that you received the initial request for this wire transfer by email from your Supervisor", and the user may also answer "yes" (since the user believes, in both questions, that answering "yes" to them would assist the user to pass the security questionnaire and get the transaction approved). However, a Contradictions Detector 142 of the system compares the two answers and detects that one of them is necessarily untrue, as a person can receive an "initial" request only from one source (either the Vendor or the Supervisor); and such an internal contradiction between or among multiple answers may suffice for the system to estimate or to detect untrue answer(s) and to trigger or initiate other fraud-prevention mechanisms (e.g., requiring the user to call telephonically to a fraud-prevention customer service representative).

In some embodiments, the questionnaire may further enable the system to identify or detect a high-risk transaction that requires additional or increased scrutiny by the system. For example, if the user answers "yes" to the question "did you receive via Email the initial request to do this wire transfer", and then the user answers "yes" to the question "did you confirm by Phone the request with the Vendor", then a Transaction Blocking/Flagging Module 143 of the system may automatically flag the transaction as a high-risk transaction and may apply increased scrutiny to the user's answers, and/or may apply mechanisms that are described herein in order to distinguish between (i) truthful responses from the legitimate user, and (ii) un-truthful responses that the legitimate user had provided (e.g., in order to reduce his "hassle" or efforts in getting the transaction approved).

In some embodiments, the system may perform a two-prong process, for example: (i) Create a set of security-oriented questions, and check which questions are answered truthfully or un-truthfully, based on phrasing or internal contradiction, and/or by utilizing statistical validation of answers (e.g., 96 percent of users that answered "yes" to question number 1, also answered "no" to question number 2 and also answered "yes" to question number 3; a series of answers yes-no-yes is statistically found in 96% of the users who were asked this security questionnaire for approving this type of transaction; and therefore, a series of answers yes-no-no from user Bob indicates an untruthful answer by Bob); (ii) based on the analysis of step (ii), and/or based on analysis of behavioral attributes that characterize the user's interactions with the computerized system and/or the electronic device, detect a behavioral attribute that indicates that a lie or untruthful information was (or is being) provided or entered.

Some embodiments of the present invention may comprise or may thus comprise or provide a Lie Detector/Handler module or unit 134, able to detect or to estimate that a user who is currently entering input, or who recently or previously entered input, is more-probably or is most-probably or is certainly (or is estimated to be, beyond a pre-defined threshold value of certainty), a user that provides or provided untrue data or response(s) or answer(s), or exaggerated data, or rounded-up or rounded-down data, or beautified data, or even blatant lies. This may be achieved by analyzing the input-unit interactions of the user, and/or by taking into account the context or a contextual analysis of the data that was entered or provided by the user. The applicants have realized that a legitimate user (who is not a professional or experienced "fraudster" or criminal) may typically experience unease, hesitation, uncertainty, unsureness, indecision, and/or anxiety in entering his input, and may thus provide (unbeknown to him) "tell-tails" or indicators that he is providing or entering untrue data, thereby allowing the Virtual Lie Detector to estimate or to detect such lies or such untrue data.

In a first example, the system of the present invention may detect the following: a user is requested to select his annual income, from a list of pre-defined choices or values or ranges, that are presented to the user via a suitable User Interface (UI) or Graphical UI (GUI); such as, from a list presented via a drop-down menu, or via a set of "radio buttons" or check-box elements; for example, the list of options of "from 50,000 to 59,999 Dollars", and "from 60,000 to 69,999 Dollars", and "from 70,000 to 79,999 Dollars". The Applicant have realized that the on-screen pointer or mouse-pointer or touch-pad pointer, or the user's finger when utilizing a touch-screen, may act as an extension of the user's gaze or the user's sight focus; and a user whose true income is 67,500 Dollars, tends to hover temporarily with the mouse-pointer (or with his finger scrolling the list) over the True answer ("from 60,000 to 69,999 Dollars"), and only then, after a short time period (e.g., after 1 or 2 seconds, or after a time-period of T that is within a pre-defined range of values) he "beautifies" his answer by selecting a different, untrue, answer from the list (e.g., "from 70,000 to 79,999 Dollars").

Accordingly, a Hovering/Lingering Detector 144 of the system may detect that the user has opened the drop-down menu, has moved the mouse-pointer or the on-screen pointer to a first choice (e.g., the true answer), has then lingered and/or paused and/or hovered and/or stayed on it for a prolonged period of time (e.g., without clicking and without tapping it) for a time period T (e.g., for at least two seconds; or for a time period that is greater than a pre-defined threshold value), and then changed his selection by moving the on-screen pointer to another choice which is pre-defined by the system as inherently More Beneficial to the user (e.g., increased his income; reduced his monthly debt amount; increased his number of years of experience in a job; etc.). This change indicates to the system that more-probably or most-probably, or certainly, the user has lied or is lying when he selects the more beneficial option, even though he had lingered on another (less beneficial) option in his scrolling or his pointing.

In a second example, the list of options is presented to the user via a mutually exclusive set of GUI elements, such as a series of Radio Buttons that only one of them can be selected; the user may firstly select his "true" range of income; and after a slight delay, which is greater than a pre-defined time period T, the user changes or switches his answer to a "better option" that is pre-defined in the system as being more beneficial to him. This indicates to the system an untrue answer. Optionally, a timing module 145 or a timer unit or a Real Time Clock (RTC) unit may be utilized in order to perform the various timing operations that are discussed above and/or herein.

In a third example, this approach can even be utilized when the user is presented with multiple options that are not mutually-exclusive to each other, and that enable the user to select more than one answer. For example, a dating website or dating application may ask the user, "which traits do you have from the following list", followed by a series of ten checkboxes that the user can select, such as, "adventurous", "artsy", "happy", "friendly", "easily bored", "enjoys sports", and so forth. A first pass of the user over the list, may cause the user to select multiple boxes that reflect his True data; such as, the user initially marks, very rapidly (e.g., within T1 seconds of displaying the entire list to him), the boxes of "artsy" and "happy" and "enjoys sports"; then, after a certain time delay (e.g., at least T2 seconds after the user marked multiple boxes), the user suddenly removes the check from the checkbox of "artsy", because on second thought he tries to beautify his set of responses. An Additive/Modified Data Detector 146 of the system may thus be configured to monitor the user interactions; to detect that initially the user has marked a first set of choices; and after a certain delay, the user has actively modified it, prior to submitting the list of choices, particularly by adding new/additive information or selections that were not initially marked or selected; thereby indicating that the Modified/Additive item(s) are more probably, or possible, representing untrue data.

The system may similarly operate with regard to utilization of the Mouse Wheel for scrolling, or for utilization of the Arrow Keys on a keyboard, or other methods (e.g., touch-screen gestures) that enable the user to highlight or to check a particular option (or set of options) and then enable the user to change his selection(s). It is noted that in some embodiments, the user need not actively click or tap on a first option and then select a second option, in order to estimate a lie; but rather, in some implementation, there mere detection that the user has utilized the input-unit in order to hover or pause or linger, temporarily, over Option 1, and then he actively selected to mark Option 2, may suffice for triggering a fraud alert or a lie alert or a possible-lie alert.

In some embodiments, this may be detected via a Lingered Scrolling Detector 147 when the user utilizes a touch-screen (e.g., of a smartphone, tablet, smart-watch, touch-screen laptop, touch-screen desktop computer), and utilizes his finger(s) to scroll through a list. For example, when scrolling through a list, the user may place his finger specifically on the "true" answer, and may then scroll the list upwardly or downwardly on the touch-screen, and may then Tap or Click on another option (not the option that was held temporarily to engage the scrolling operation), thereby indicating a lie in the user's choice. For example, the user may place his finger specifically on the option of "my income is in the range of 60,000 to 69,999 Dollars", may then move his finger upwardly and/or downwardly on the touch-screen to scroll the on-screen list, and may then click or tap on another option (e.g., "my income is in the range of 80,000 to 89,999 Dollars"), thereby indicating a possible lie; particularly if the actually-selected option is pre-defined in the system as an option that is more favorable or more beneficial for a user than the option that was engaged with his finger merely for the purpose of scrolling the list itself.

The Applicants have realized that some human users may exhibit hesitation, or hesitation-based delay, when they perform a process in which they firstly consider to select the True answer, and then they actually select an Untrue answer (or, when they firstly consider the True answer and they momentarily click or tap or select it, and then they Switch their selection to an Untrue answer). Accordingly, a Hesitation Detector 148 module analyzes the input-unit interactions and the user's gestures, to identify or detect exactly this type of user behavior as reflected via such interactions or gestures; such as, the user firstly positioning the on-screen pointer over a particular answer (e.g., the "true" answer of "I earn between 60,000 to 69,999 Dollars per year"), then exhibits a delay of at least T milliseconds (e.g., at least 1,500 or 2,000 milliseconds, or other pre-defined threshold value), and then moves the on-screen pointer to a second particular answer (e.g., a more beneficial answer from the user's point of view, or a "beautified" response or rounded response) and selects that second particular answer; or alternatively, the user first Selecting a first particular answer from the list, and then after the hesitation-based delay, and before he clicks on the Submit Form button or GUI element, the user actively changes or switches his answer to a second, different, answer from the list of answers. The detected hesitation, or the detected or estimated hesitation-based delay between those two events, may be used by itself and/or in conjunction with other behavioral data to trigger a decision of a lie or a possible lie by the user.

Additionally or alternatively, the Hesitation Detector module 148 may analyze the user interactions and may detect an abnormal delay in filling-out a particular field or a prolonged time-period that is required for such operation, even without necessarily observing that the user has switched or corrected his input or changed his mind. For example, the Hesitation Detector module analyzes the input-user interactions of filling-out a credit application; detects that it took the user: 1.2 seconds to fill-out his first name field; then 1.3 seconds of delay or non-activity; then 1.1 seconds to fill-out the last name field; then 1.25 seconds of delay or inactivity; then 1.0 seconds to select his gender from a drop-down menu; and then, either one or all of the following: (a) a delay of 8 seconds until the user filled out, or started to fill out, the field of "what is my annual income"; and/or (b) a time-period of 7 seconds of actual typing of the income in that field, or of browsing several options in a drop-down menu and then selecting one option; and/or (c) the user filled out "67,000" in the income field, and after a delay of 9 seconds, engaged again with that field, deleted his previously-entered data (or part of it), and instead entered "71,000" in the income field. Some or all of these indicators, individually or in the aggregate, may be utilized by the system to estimate that a hesitation or a hesitation-based delay are detected, and that they are (or that they may be) indicators of a lie that the user is entering or has entered.

In some embodiments, the Hesitation Detector 148 may compare the measured time-periods (for filling-out a field; for selecting an option from a list of options; for typing; for waiting with inactivity between two GUI elements; etc.) to one or more threshold values or ranges of values; which may be set based on the prior/historical usage of this particular user (e.g., in his current usage session at MyBank.com to fill-out a credit application the user exhibits an average time of T1 seconds to fill-out a set of fields; whereas, in the past the same user at the same website had exhibited a shorter average time of T2 to fill-out the same set of fields or a generally-equivalent set of fields; whereas T2 is longer than T1 by a pre-defined difference value or percentage value); or which may be based on the current time-periods of that same user among different fields (e.g., the user fills out fields A and B and C in the form rapidly in under T3 milliseconds, but fills-out field D in the form ("what is your annual income") in more than T4 milliseconds); or which may be based on the average or median time-period(s) that the general population exhibits when filling-out the same form and/or the same fields and/or the same type of transactions (e.g., credit application); or which may be based on the average or median time-period(s) that a particular subset of the population exhibits when filling-out the same form and/or the same fields and/or the same type of transactions, for example in order to take into account user-specific features such as his age, thereby comparing the user's speed in completing the form (or a particular field) only with the average speed of users in her same age range and/or gender (e.g., only females of 60 to 70 years old); or based on other empiric data, or research data, or time-periods or threshold values that were measured by utilizing a "focus group" or a "sample population", or the like. The system may utilize other suitable parameters and/or conditions in order to detect that the particular user has spent an increased amount of time to select or to fill-out a particular field or form or data-item, relative to himself (his past behavior) and/or to the general population of users and/or to a particular subset of user; thereby indicating that this particular user is estimated to be lying or most-probably or more-probably provided an untrue response.

Some embodiments may utilize a Data-Entry Correction Detector module 149, in order to analyze the user interactions and to detect that the user selected or entered a first particular value or selection, and then (either immediately; or after a delay period of at least T milliseconds; or later after filling-out or selecting other fields or answers) went back to his original selection or entry and switched his response to another selection or manually corrected his previous entry (e.g., by deleting all or part of his previous data-item, and typing a new data-item instead), and particularly that the "corrected" or modified or amended data-item has a value that is more beneficial to a user and/or that is a rounded or is "beautified" relative to the original data-item; since, in accordance with the present invention, users that select or enter a first value, and then correct it or replace it with another value, are estimated to be less-truthful or un-truthful and may trigger a Lie determination or a possible-lie determination for additional scrutiny or review.

The Data-Entry Correction Detector module 149 may take into account, particularly, user interactions or gestures that involved or included the utilization of Delete or Backspace keys, or the switching of an answer in a drop-down menu or in a list of radio buttons from a first choice to a second choice, or to other manners of correcting data or switching answers. The Data-Entry Correction Detector module may further take into account the context in which the data-entry correction was made: for example, when user "Adam Smith" firstly types his name in the "name" field as "Adam Smitt" and then rapidly corrects it with a Backspace to "Adam Smith", the Data-Entry Correction Detector module 149 may interpret this as a legitimate typographical error that was rapidly corrected (e.g., within T milliseconds of the first entry) to the correct spelling (which can also be verified independently as a true answer). In contrast, later in the same online application form, the same user Adam Smith types the number "67,500" in the "annual income" field, then he delays with inactivity for 5 seconds, then he fills out his home address, then he delays with inactivity for 6 seconds, and then he goes back to engage again with the "annual income" field, he manually deletes his previous entry of "67,500", and he then manually types a modified (and more beneficial for him) entry of "72,000"; the Data-Entry Correction Detector module does not interpret this modification, with this timeline, and with this context of what was modified, to be merely a rapid correction of a typographical error; but rather, it interprets it as the user attempting to beautify and replace his "annual income" data with untrue data in an intentional manner.

Some embodiments may utilize a Jittering/Fidgeting Detector module 126, in order to monitor the user interactions with one or more input unit(s) of the electronic device, and/or in order to monitor one or more properties of the electronic device itself (e.g., spatial orientation, spatial position, spatial slanting relative to the ground, acceleration, deceleration, data sensed by one or more accelerators and/or gyroscopes and/or compass units, or the like), and in order to detect jittering behavior and/or fidgeting behavior that are exhibited by the user during or before or after the data-entry process, thereby enabling the system to determine or to estimate that the user entered or is entering untrue data.

In a first example, user Adam is utilizing a laptop computer to fill-out an online credit application; he fills-out rapidly the first three fields (first name, last name, home address) without exhibiting jittering or fidgeting; and then, between filling-out those three fields and the filling-out of the next field ("annual income"), user Adam exhibits jittering or fidgeting activity, such as aimless movement or the on-screen pointer by aimless movement of the computer-mouse or similar gestures on the touch-pad), such as performing generally-circular motions of the on-screen pointer and/or back-and-forth or right-and-left and up-and-down motions of the on-screen pointer, during the time period in which user Adam thinks what to fill-out in the "annual income field"; then user Adam, after 9 seconds of such jittering or fidgeting activity, fills-out the "annual income" field, and then he proceeds to fill-out the remaining fields (e.g., gender, age, marital status) without exhibiting such fidgeting/jittering, or while exhibiting a reduced-time or reduced-intensity of such fidgeting/jittering behavior (e.g., exhibiting it for only 1 second between two fields, and not for 9 seconds before he filled-out the Annual Income field; or exhibiting it in a less intensive manner, such as by moving the on-screen pointer back-and-forth at about 300 pixels sideways each time, and not for 750 pixels sideways each time before he filled-out the Annual Income field); and such fidgeting/jittering control of the on-screen mouse pointer may be used by the system to determine or to estimate that an untrue response was provided by user Adam in the data-item that was provided or selected or filled-out immediately after such jittering/fidgeting was detected.

In a second example, user Bob is utilizing a smartphone or tablet to fill-out an online credit application; he fills-out rapidly the first three fields (first name, last name, home address) without exhibiting jittering or fidgeting; and then, between filling-out those three fields and the filling-out of the next field ("annual income"), user Bob exhibits jittering or fidgeting activity, such as aimless spatial movement or rotation of the entire smartphone/tablet, general shaking or rotating of the smartphone/tablet, or back-and-forth slight rocking movement of the entire smartphone/tablet, during the time period in which user Bob thinks what to fill-out in the "annual income field"; then user Bob, after 8 seconds of such jittering or fidgeting activity with the entirety of the electronic device, fills-out the "annual income" field, and then he proceeds to fill-out the remaining fields (e.g., gender, age, marital status) without exhibiting such fidgeting/jittering, or while exhibiting a reduced-time or reduced-intensity of such fidgeting/jittering behavior (e.g., exhibiting it for only 1.2 seconds between two fields, and not for 8 seconds before he filled-out the Annual Income field; or exhibiting it in a less intensive manner, such as by spatially rocking his electronic device sideways at an angle of 15 degrees back and forth, and not for 50 degrees back and forth sideways each time before he filled-out the Annual Income field); and such fidgeting/jittering of the entirety of the electronic device may be used by the system to determine or to estimate that an untrue response was provided by user Bob in the data-item that was provided or selected or filled-out immediately after such jittering/fidgeting was detected.

The fidgeting/jittering behavior or activity may be measured or sensed or compared relative to, for example, prior/historical/past data of the same user himself (e.g., from his previous usage sessions); and/or to historical data of the general population of users of the same website or application, or the population of users of this particular request form (e.g., users that filled-out the same credit application form); and/or to a subset of users that share one or more traits with the currently-analyzed user (e.g., same gender; same age; same age-range); and/or to empirical data or research data, or data that was collected by utilizing a "focus group" or a sample of known users, or other sources that may enable to set such threshold values or ranges for comparison or analysis purposes.

Some embodiments may detect jittering and/or fidgeting, of the on-screen pointer, and/or of the entirety of the electronic device, and/or of a particular input-unit (e.g., the computer-mouse). In some embodiments, a user who lies typically exhibits jittering and/or fidgeting immediately prior to performing his untrue data-entry or immediately prior to providing his "less honest" or "beautified" answer (e.g., mouse movement is rapid and/or repeated and/or with no particular purpose; mobile device acceleration data and/or gyroscope data and/or compass data are changing rapidly, relative to pre-defined threshold values or ranges). In some embodiments, once the untrue or inaccurate selection was made by the user, and the "lie" entry is completed, the user may experience a catharsis and self-justification in which he internally accepts his acts and his selection and stops (or reduces) his jittering/fidgeting activity or behavior. Accordingly, some embodiments may particular search for, find, and detect a series of (i) jittering/fidgeting, then (ii) entry of a particular data-item or selection, then (iii) no more jittering/fidgeting (or, reduced-intensity jittering/fidgeting), as a series that indicates an untrue entry of that particular data-item or selection.

Some embodiments may detect or estimate that a particular data-item, or a set of particular data-items, is or contains a lie or untrue information, based on an aggregation or a weighted aggregation of multiple indicators that are detected or observed or estimated to exist, as weighted or computed in aggregate by a Possible-Lie Weighted Score Generator 127 which is able to generate a weighted score (e.g., within a range of 0 to 100) indicating the estimated possibility or probability that a Lie or untrue data was entered; for example, by taking into account, at different relative weights, (i) hesitation in filling-out and/or selecting a particular data-item, (ii) prolonged hovering or highlighting of a first answer before then selecting a different answer, (iii) manual correction or manual beautification of an entered data-item, (iv), jittering/fidgeting behavior or activity of the on-screen pointer and/or of an input unit (e.g., computer-mouse) and/or the entire electronic device, (v) time delays within filling-out of a particular field, (vi) time delays between or among data-entry (or selections) of certain pairs of fields or groups of fields, (vii) contextual analysis that takes into account which data-item is being filled-out and/or corrected (e.g., correcting the Annual Income data-item may be of increased significance for lie detection, whereas correcting a one-letter typographical error in the first name of the user may be of lesser significance for lie detection), (viii) contextual analysis that takes into account which type of contextual correction was performed by the user (e.g., user Adam performed a data-beautifying correction by changing his Annual Income data-item from 67,500 to 72,000 Dollars, indicating a possible lie; whereas, user Bob performed a "neutral" correction that is not necessarily to the benefit of the user, such as correcting his first name from "Bov" to "Bob", or correcting his Annual Income from "67,500" to "67500", or even correcting his Annual Income from "67,500" to "67,000" which is pre-defined by the system as a less-beneficial correction from the user's point of view and thus is not a Lie indicator), and/or other suitable parameters or conditions. Optionally, a weighting module may be used to allocate a weight or a relative weight to each indicator or condition, and/or to generate a weighted/aggregated Lie-Possibility Score or Untruthfulness Score (e.g., in a scale or range of 0 to 100); for example, allocating 20% weight to the Delay/Hesitation indicator, allocating 48% weight to the Data-Entry Correction indicator, and allocating 32% weight to the Jittering/Fidgeting indicator; other suitable ratios or weights or formulas may be utilized, and the weighted result or score may be compared to pre-defined threshold value(s) or range(s) in order to determine whether or not to trigger a Lie Detection notification or in order to block or prevent completion of a request or a transaction.

Some embodiments of the invention may utilize, as an indicator for entry of untrue data by a user, the detecting of a prolonged hovering or a prolonged lingering of the user, over or at a particular choice or answer, before the user then chooses that particular answer or before the user then chooses a different choice or different answer. It is noted that theoretically, any human that utilizes an input unit or that operates an on-screen pointer, may exhibit at least some slight degree of "lingering" or "hovering", since human behavior in its nature is typically not instantaneous, and there is almost always a slight delay or time-gap between two consecutive actions of the user. Nevertheless, the present invention detects and utilizes a particular type of lingering or hovering, which is a Prolonged lingering or a Prolonged hovering; such as, detected through-out a time period that is greater than a pre-defined threshold value. For example, the system may be configured to define that a lingering or hovering of up to 0.8 seconds, over a particular choice or answer, or between two consecutive data-items, is considered "neutral" or "typical"; whereas, a prolonged hovering/lingering that is at least 0.8 seconds long, would be regarded as a tell-tale or indicator for possible lying or for providing a dishonest input. Similar considerations and threshold values may be used in the portions of the discussion herein that relate to the user causing the on-screen pointer to "stand over" a choice, or "marking" or "highlighting" a choice temporarily; and such operations may become indicators to a possible lie, only if they span a time-period that is greater than a threshold value.

Some embodiments of the invention may utilize, as an indicator for entry of untrue data by a user, the detecting of jittering, fidgeting, aimless mouse movements, aimless on-screen-pointer movement, back-and-forth movement of the input unit and/or of the on-screen pointer, or the like; and similarly to the description above, some embodiments may require that these (or some of them) would be observed or detected for at least a pre-defined time-period (e.g., at least 1.6 seconds, immediately prior to the entry of a data-item or a response) in order to be regarded as a valid indicator for a lie or a possible-lie. For example, some human users who do not necessarily intend to lie or to enter dishonest data, may inadvertently exhibit jittering or fidgeting as described above, for a short period of time between entry of multiple data-items in an online form; and therefore, the system may check whether the observed behavior spans at least a pre-defined time period, in order to be regarded as an indicator or tell-tale for lying. Accordingly, some embodiments may disregard or may discard "short" bursts of jittering or fidgeting behavior; and in contrast, may rely only on "prolonged" sessions of jittering and/or fidgeting behavior that are longer than a pre-defined threshold value.

Some embodiments may utilize the detection of "aimless" or "purposeless" movement of the input-unit and/or the on-screen-pointer and/or the entire electronic device; and may utilize one or more conditions, criteria, threshold values, lookup tables, and/or ranges-of-values, in order to determine firstly whether a particular behavior is indeed aimless or purposeless, or not. For example, some embodiments may define that a user who moves the mouth-pointer back-and-forth for at least N strokes (e.g., at least 5 times), or for at least P pairs of strokes (e.g., at least 3 pairs strokes, each pair having a stroke to the right and then a stroke to the left), or for at least M generally-circular movements (e.g., at least 3 circles were virtually drawn or traced by the user's fidgeting via the mouse), would be considered as exhibiting fidgeting or aimless or purposeless behavior; whereas, behavior that does not reach those thresholds would be disregarded or discarded, or would not be utilized as a possible tell-tale for lying.

In some embodiments, other suitable criteria or conditions may be used, by themselves and/or as part of a weighted aggregation with other criteria or conditions, to trigger a determination of Lie Detection with regard to a particular data-item or set of data-items or a form; for example, (i) changes in typing-speed across different fields of the same form or page (e.g., user Adam types at a speed V1 when entering his name and address, but types at a slower speed V2 when entering his annual income, wherein V2 is smaller than V1 by a pre-defined threshold difference or percentage value); (ii) excessive (e.g., relative to a pre-defined threshold value or range) and/or multiple manual corrections, in a particular field and/or in a particular set of fields and/or in an entire form or page (e.g., the user is allowed to correct his Annual Income field one time without triggering a Lie Detection; but a series of two or more corrections to the Annual Income field, again and again, trigger a Lie Detection); (iii) excessive (e.g., relative to a pre-defined threshold value or range) and/or multiple changes to the focus of the on-screen pointer (e.g., user Bob repeatedly moves the on-screen pointer, from the Annual Income field, to the Address field, then again to the Annual Income field, then to the Family name field, then again to the Annual Income field, then to the First Name field, then again to the Annual Income field; indicating a possible Lie in the data-item of the Annual Income field, that user Bob is considering or hesitating to enter and/or to modify); (iv) excessive (e.g., relative to a pre-defined threshold value or range) and/or multiple mistakes or errors in a particular field or set-of-fields or GUI elements, taking into account the context of each data-item (e.g., the user is allowed to correct up to three characters in his Family Name without triggering a Lie detection; whereas, if the same user corrects two or more characters in his Annual Income field that a Lie detection is triggered); (v) pre-defined considerations and conditions indicating an expected level of familiarity of a user with a particular field or data-item, such that data-items that the user is more familiar with, or that the user enters more frequently (e.g., his first name, his last name, his address) are expected to exhibit less delays and/or less corrective operations and/or less hesitations and/or less fidgeting/jittering; whereas, data-items that the user is expected to be less familiar with, or that a user typically enters less frequently (e.g., his Annual Income; or his bank account number) may be defined as more tolerant to mistakes or to corrections, in some embodiments; (vi) pre-defined switching between utilization of a first input-unit for filling out a first set of fields, to utilization of a second, different, input-unit for filling-out a different set of fields or a single other field (for example, the user utilizes his computer-mouse to select the relevant option from a drop-down menu in 9 out of the 10 data items in a credit application (gender, age range, marital status, number of children, and so forth); but utilizes the arrow-keys of the keyboard to fill-out one other particular field (e.g., Annual Income) from a drop-down menu of options for that field, indicating a possible Lie in that particular field. Other suitable conditions or criteria may be used. The above-mentioned operations, determinations and/or conditions may be implemented by using one or more dedicated modules or analysis units, or as part of the Lie Detector/Handler module 134.

For demonstrative purposes, and to not over-crowd the drawings, some of the modules or units that are described above or herein, as depicted as being part of only the end-user device 110, or as being part of only the server 150; however, each one of such modules and/or units, may be implemented as a client-side (end-user device side) module or unit, or as a server-side module or unit, or as combined or hybrid client-and-server module that operates partially locally in device 110 and partially remotely in server 150. Other suitable implementations may be utilized.

Some embodiments of the present invention may successfully operate, and may successfully detect a lie or a dishonest data-item that was inputted by a user, in at least N percent of the situations; and the present invention need not necessarily operate successfully in 100 percent of the situations. In the field of Information Technology (IT) and security, it is common and typical that systems do not achieve 100 percent of success, and they are still usable and they still provide significant utility to millions of users and corporations. For example, an anti-virus program or anti-malware program may catch 99 or 95 or 80 percent of known malware, and not necessarily all malware modules, and is still usable and beneficial and provides utility to users. Similarly, many online systems, including online banking systems and e-commerce systems, are often defeated by cyber-attacks and hacking, but are still considered as usable and as beneficial and as providing utility to users. Similarly, the present invention provides utility and benefits to users, and particularly to administrators and owners of computerized system (e.g., a banking website, a bank, or the like), even if some embodiments of the present invention may actually detect or block "less than 100 percent" of lies or fraudulent transactions, or only 90 or 75 or 50 or 25 percent of lies or fraudulent transactions. In fact, some embodiments may intentionally be configured by the system administrator, to reduce to the minimum the number of "false positives" (namely, to reduce to the minimum the number of data-items that are detected by the system as a Lie but are in fact True Data), even at the expense of "missing out" on some of such Lies. For this purpose, the threshold values and the ranges-of-values, as well as the various conditions for Lie indicators, may be configured or fine-tuned or modified by the system or by the system administrator, in order to remain within a desired quota of detections. In an example, the system may observe than if the threshold value for "prolonged fidgeting" is set at "at least 2.5 seconds", then the system raises a Lie flag for 100 out of 500 transactions that are analyzed, and this may be excessive for further scrutiny; and therefore, the system may be re-configured or modified, such that the threshold value for "prolonged fidgeting" would be set to "at least 3.8 seconds", thereby reducing the Lie detections to 12 out of 500 transactions, and thereby reducing the amount of "false positive" errors and enabling more efficient scrutiny or review of the flagged transactions.

Some embodiments of the present invention operate without the need to generate and/or to present to the user any "challenge" or any "challenge/response" set, or any CAPTCHA mechanism or similar mechanism, or any obstacle or riddle or challenge that requires the user to perform any additional task other than to provide answers to relevant questions, and without the need to pose to the user additional or redundant questions other than the questions whose answers are being validated as true or false; and without the need to inject into the input-output interface or GUI any aberration or abnormality or interference that disturbs or pauses or stops or delays or burdens the user's interactions with the website or application.

Some embodiments of the present invention may detect a lie, or a dishonest or untrue input, that was entered or provided by a legitimate human user or by an authenticated human user or by a logged-in human user, namely, the genuine user that legitimately has the required credentials to access a service. This is in contrast with some conventional systems, such as a CAPTCHA mechanism, whose purpose is to distinguish between a human user and a non-human user (e.g., a "bot", an automated script). This is also in contrast with some conventional systems, such as password-based authentication systems, whose purpose is to distinguish between the legitimate human user and an illegitimate human attacker.

In accordance with the present invention, a method comprises: monitoring input-unit gestures and interactions of a user that inputs data through an electronic device; and based on analysis of said input-unit gestures and interactions, determining that said user has inputted false data through said electronic device.

In some embodiments, said analysis comprises: presenting to said user a question and multiple choices; detecting that said input-unit gestures and interactions comprise a prolonged hovering of an on-screen pointer over a first particular choice, and then an actual selection of a second, different, particular choice; based on said detecting, determining that said second particular choice, that was selected by the user, represents untrue data.

In some embodiments, said analysis comprises: presenting to said user a question and multiple choices; detecting that said input-unit gestures and interactions comprise an initial marking of a first particular choice, and then a subsequent marking and submission of a second, different, particular choice; based on said detecting, determining that said second particular choice, that was selected by the user, represents untrue data.

In some embodiments, said analysis comprises: presenting to said user a question and multiple choices; detecting that said input-unit gestures and interactions comprise at least N times in which the user switched his selected choice out of said multiple choices, wherein N is a pre-defined threshold value; based on said detecting, determining that the final choice that was submitted by the user, represents untrue data.

In some embodiments, said analysis comprises: presenting to said user a set of multiple fields that are fillable; detecting from said input-unit gestures and interactions, that a particular field was filled-out by the user at a speed that is at least N percent slower than the average speed of filling other fields, wherein N is a pre-defined threshold value; based on said detecting, determining that said particular field comprises untrue data.

In some embodiments, said analysis comprises: presenting to said user a set of multiple-choice questions; detecting from said input-unit gestures and interactions, a hesitation period in which said user hesitated prior to inputting his answer to a particular question; based on said detecting, determining that said user provided a false answer to said particular question.

In some embodiments, said analysis comprises: presenting to said user a set of fillable fields; detecting from said input-unit gestures and interactions, that at least N corrective input-gestures were performed in a particular fillable field, wherein N is a pre-defined threshold value; based on said detecting, determining that said user provided untrue data into said particular fillable field.

In some embodiments, said analysis comprises: presenting to said user a question and multiple choices through a touch-screen of said electronic device; detecting that said input-unit gestures and interactions comprise a lingered scrolling that includes a first choice, and then an actual selection of a second, different, particular choice that was not part of said lingered scrolling; based on said detecting, determining that said second particular choice, that was selected by the user, represents untrue data.

In some embodiments, said analysis comprises: presenting to said user a question and multiple choices; detecting that said input-unit gestures and interactions comprise a lingered positioning of an on-screen pointer over a first particular choice, and then an actual selection of a second, different, particular choice; based on said detecting, determining that said second particular choice, that was selected by the user, represents untrue data.

In some embodiments, said analysis comprises: detecting that said input-unit gestures and interactions comprise aimless fidgeting movement of an on-screen pointer, for at least a pre-defined time period, prior to providing a response to a posed question; based on said detecting, determining that said response to said posed question comprises untrue data.

In some embodiments, said analysis comprises: monitoring spatial orientation of said electronic device, immediately prior to manual data-entry by said user of a response to a particular question; detecting jittering in said spatial orientation of said electronic device prior to entry of said response to said particular question, and further detecting reduction in said jittering immediately after entry of said response to said particular question; based on said detecting operations, determining that said response to said particular question comprises untrue data.

In some embodiments, said analysis comprises: (a) detecting that said input-unit gestures and interactions comprise modification of an initial response into a secondary response, and then submission of said secondary response; (b) based on one or more pre-defined conditions, checking whether said secondary response is more beneficial to said user relative to said initial response; (c) if the checking result is positive, then determining that said secondary response is untrue.

In some embodiments, said analysis comprises: (a) detecting that said input-unit gestures and interactions comprise modification of an initial response into a secondary response, and then submission of said secondary response; (b) based on one or more pre-defined conditions, checking whether said modification is a beautification of said initial response to the benefit of said user; (c) if the checking result is positive, then determining that said secondary response is untrue.

In some embodiments, said analysis comprises: generating a weighted possible-lie score, with regard to a particular data-item that was inputted by said user, based on a weighted aggregation of multiple indicators that are extracted from said input-unit gestures and interactions; if said weighted possible-lie score, is greater than a pre-defined threshold value, then determining that said particular data-item that was inputted by said user is untrue.

In some embodiments, said analysis comprises: monitoring device acceleration data sensed by an accelerometer of said electronic device, immediately prior to manual data-entry by said user; based on an analysis that takes into account at least (I) said acceleration data and (II) input-unit gestures and interactions, determining that a data-item that was provided by the user in said manual data-entry is untrue.

In some embodiments, said analysis comprises: monitoring device spatial-orientation data sensed by a gyroscope of said electronic device, immediately prior to manual data-entry by said user; based on an analysis that takes into account at least (I) said spatial-orientation data and (II) input-unit gestures and interactions, determining that a data-item that was provided by the user in said manual data-entry is untrue.

In some embodiments, the method comprises: based on said determining that said user has inputted false data through said electronic device, blocking or denying a request submitted by said user through said electronic device.

In some embodiments, said determining that said user has inputted false data through said electronic device, comprises: determining that said user has inputted false data in response to a particular question out of a plurality of questions of an online form requesting financial benefits for said user.

In some embodiments, said determining that said user has inputted false data through said electronic device, comprises: determining that said user has inputted false data in response to a particular question out of a plurality of questions of an online security questionnaire that prevents corporate email fraud.

In some embodiments, a process comprises: (a) monitoring input-unit gestures and interactions of a user that inputs data through an electronic device; (b) monitoring spatial properties of said electronic device, immediately prior to said input-unit gestures and interactions, via at least one of: an accelerometer of said electronic device, a gyroscope of said electronic device, a compass unit of said electronic device, a device-orientation sensor of said electronic device; (c) checking whether a particular modification of a data-item, that was performed by said user via said input-unit gestures and interactions, matches a pre-defined condition that indicates that said particular modification is considered beneficial for said user; (d) based on cumulative analysis of (I) said input-unit gestures and interactions, and (II) said spatial properties of said electronic device immediately prior to said input-unit gestures and interactions, and (III) whether or not said particular modification is considered beneficial for said user, determining that said user has inputted false data in said particular modification of said data-item.

In some embodiments, a process comprises: (a) monitoring input-unit gestures and interactions of a user that inputs data through an electronic device; and/or (b) monitoring spatial properties of said electronic device, immediately prior to said input-unit gestures and interactions, via at least one of: an accelerometer of said electronic device, a gyroscope of said electronic device, a compass unit of said electronic device, a device-orientation sensor of said electronic device; and/or (c) checking whether a particular modification of a data-item, that was performed by said user via said input-unit gestures and interactions, matches a pre-defined condition that indicates that said particular modification is considered beneficial for said user. Then, (d) based on cumulative analysis of at least two out of these: (I) said input-unit gestures and interactions, and/or (II) said spatial properties of said electronic device immediately prior to said input-unit gestures and interactions, and/or (III) whether or not said particular modification is considered beneficial for said user, determining that said user has inputted false data in said particular modification of said data-item.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

The present invention may be implemented by using hardware units, software units, processors, CPUs, DSPs, integrated circuits, memory units, storage units, wireless communication modems or transmitters or receivers or transceivers, cellular transceivers, a power source, input units, output units, Operating System (OS), drivers, applications, and/or other suitable components.

The present invention may be implemented by using a special-purpose machine or a specific-purpose that is not a generic computer, or by using a non-generic computer or a non-general computer or machine. Such system or device may utilize or may comprise one or more units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

The present invention may be implemented by using code or program code or machine-readable instructions or machine-readable code, which is stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such device to perform a method in accordance with the present invention.

The present invention may enable machines and/or computerized systems to have new capabilities and/or new functions that were not available to such machines or systems so far; including, for example: a new capability to correctly differentiate among multiple human users; a new capability for machines or computerized systems to differentiate between (I) a legitimate or "naïve" user, and (II) a fraudster or a human user having criminal intent or an illegitimate user; a new capability for machines or computerized systems allowing the machine or the computerized system to defend itself or to protect itself against cyber-attacks and/or illegitimate operations, and/or against impostors or identity-thieves or dishonest users; a new capability for machines or computerized systems to correctly identify and/or detect that a current user of an online resource or an online destination, is not the same human user that had accessed the same resource previously, even if the two access sessions were performed via the same device and/or via the same browser or application and/or from the same IP address and/or when the user/s are already logged-in and/or are already authenticated; a new capability for machines or computerized systems to defend or protect themselves against fraudulent transactions or criminal behavior or against hackers, crackers, human hackers, automated hacking tools, "bot" or other automated scripts; a new capability for machines or computerized systems to initiate and to perform fraud-mitigation operations based on analysis of user interactions; improved security and/or integrity and/or reliability of machines and computerized systems; and/or other new capabilities that conventional machines and conventional computerized systems do not have and that the present invention provides.

Embodiments of the present invention may be utilized with a variety of devices or systems having a touch-screen or a touch-sensitive surface; for example, a smartphone, a cellular phone, a mobile phone, a smart-watch, a tablet, a handheld device, a portable electronic device, a portable gaming device, a portable audio/video player, an Augmented Reality (AR) device or headset or gear, a Virtual Reality (VR) device or headset or gear, a "kiosk" type device, a vending machine, an Automatic Teller Machine (ATM), a laptop computer, a desktop computer, a vehicular computer, a vehicular dashboard, a vehicular touch-screen, or the like.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

The system(s) and/or device(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C #, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a list of reference value(s) or a database of reference values or ranges; a comparison or matching or searching process which searches for matches and/or identical results and/or similar results and/or sufficiently-close results, among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Repeated use of the phrase "in one embodiment" does not necessarily refer to the same embodiment, although it may. Repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may comprise, or may be implemented by using, an "app" or application which may be downloaded or obtained from an "app store" or "applications store", for free or for a fee, or which may be pre-installed on a computing device or electronic device, or which may be transported to and/or installed on such computing device or electronic device. In some embodiments, a method comprises: (a) monitoring user interactions of a user that Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings, or even if they are depicted in any drawing(s) without necessarily being connected via a line or an arrow.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A method comprising:
monitoring input-unit gestures and interactions of a user that inputs data through an electronic device towards a computerized system;
based on analysis of said input-unit gestures and interactions, determining that said user has inputted through said electronic device data that said user knows to be false in order to increase a benefit that said computerized system provides to said user;
wherein said analysis comprises:
(a1) presenting to said user a form having a plurality of data-entry fields, including therein a first data-entry field and a second data-entry field;
(a2) defining, via at least one of: (A) a set of pre-defined rules, (B) a lookup table,
that a particular type of changes to data, that is entered in said first data-entry field in accordance with pre-defined timing rules and pre-defined context rules, is to be handled as a beautifying correction which increases the benefit that said computerized system provides to said user;
(a3) defining, via at least one of: (A) said set of pre-defined rules, (B) said lookup table,
that a particular type of changes to data, that is entered in said second data-entry field in accordance with pre-defined timing rules and pre-defined context rules, is to be handled as a non-beautifying correction which does not increase the benefit that said computerized system provides to said user;
(b1) detecting that said user typed via a keyboard a first value into said first data-entry field, and then changed said first value to a first replacement value;
(b2) based on per-field definitions made in step (a2), and by taking into account at least a first context and a first timing in which step (b1) was performed, determining that changes that the user performed in step (b1) in the first data-entry field, are a beautifying correction that was performed by said user via said electronic device in order to increase the benefit that said computerized system provides to said user, and triggering a determination that the first replacement value is false;
(c1) detecting that said user typed via said keyboard a second value into said second data-entry field, and then changed said second value to a second replacement value;
(c2) based on per-field definitions made in step (a3), and by taking into account at least a second context and a second timing in which step (c1) was performed, determining that changes that the user performed in step (c1) in the second data-entry field, are a non-beautifying correction which does not trigger a determination that the second replacement value is false.

2. The method of claim 1,
wherein the method is implemented by a hardware processor which (i) does not have a-priori knowledge whether the first value is true or false and (ii) does not have a-priori knowledge whether the second value is true or false.

* * * * *